United States Patent
Adamson

[19]

[11] Patent Number: 6,088,249
[45] Date of Patent: *Jul. 11, 2000

[54] FREQUENCY MODULATED BALLAST WITH LOOSELY COUPLED TRANSFORMER

[75] Inventor: Hugh Patrick Adamson, Boulder, Colo.

[73] Assignee: Power Circuit Innovations, Inc., Boulder, Colo.

[ * ] Notice: This patent is subject to a terminal disclaimer.

[21] Appl. No.: 09/063,934

[22] Filed: Apr. 21, 1998

Related U.S. Application Data

[63] Continuation-in-part of application No. 08/982,974, Dec. 2, 1997, Pat. No. 5,933,340.

[51] Int. Cl.[7] .......................... H02M 3/335; H05B 37/02
[52] U.S. Cl. .................. 363/97; 315/209 R; 315/DIG. 7
[58] Field of Search .................................. 363/97, 34, 37, 363/95; 315/209 R, 222, 246, 248, DIG. 7

[56] References Cited

U.S. PATENT DOCUMENTS

| | | |
|---|---|---|
| 2,403,393 | 7/1946 | Peterson . |
| 2,419,771 | 4/1947 | Goddard . |
| 2,804,588 | 8/1957 | Hjermstad . |
| 2,806,199 | 9/1957 | Sola . |
| 2,870,398 | 1/1959 | Sola . |
| 3,293,537 | 12/1966 | Sola . |
| 3,389,329 | 6/1968 | Quirk et al. . |
| 3,584,290 | 6/1971 | Spreadbury . |
| 3,610,944 | 10/1971 | Mitsul et al. . |
| 3,803,479 | 4/1974 | Rathor . |
| 3,904,954 | 9/1975 | Kunudson . |
| 3,919,595 | 11/1975 | Willis, Jr. . |
| 3,938,033 | 2/1976 | Borkovitz et al. . |
| 3,962,661 | 6/1976 | Boyd et al. . |
| 4,100,476 | 7/1978 | Ghiringhelli . |
| 4,123,736 | 10/1978 | Brougham . |
| 4,134,044 | 1/1979 | Holmes . |
| 4,144,477 | 3/1979 | Eaton . |
| 4,187,450 | 2/1980 | Chen . |
| 4,242,630 | 12/1980 | Szakpwski et al. . |
| 4,347,466 | 8/1982 | Ottoson . |
| 4,414,491 | 11/1983 | Elliott . |
| 4,453,109 | 6/1984 | Stupp et al. . |
| 4,484,108 | 11/1984 | Stupp et al. . |
| 4,684,850 | 8/1987 | Stevens ............................... 315/209 R |
| 4,774,649 | 9/1988 | Archer . |
| 4,800,356 | 1/1989 | Ellis . |
| 4,888,527 | 12/1989 | Lindberg . |
| 5,047,696 | 9/1991 | Nilssen . |
| 5,180,950 | 1/1993 | Nilssen . |
| 5,192,896 | 3/1993 | Qin . |
| 5,453,667 | 9/1995 | Matsuda et al. ........................ 315/248 |
| 5,519,289 | 5/1996 | Katyl et al. . |
| 5,648,702 | 7/1997 | Choi et al. . |
| 5,933,340 | 8/1999 | Adamson .................................. 363/97 |

FOREIGN PATENT DOCUMENTS

| | | |
|---|---|---|
| 0 108 815 A1 | 5/1984 | European Pat. Off. . |
| 0 461 441 A1 | 12/1991 | European Pat. Off. . |
| 1 240 556 | 7/1971 | United Kingdom . |
| WO 93/01695 | 1/1993 | WIPO . |

OTHER PUBLICATIONS

Lowdon, Eric Practical Transfoormer Design Handbook, p. 15, First Edition—Second printing 1981 Howard W. Sams & Co., Inc., Indianapolis, Indiana 46268 USA.

*Primary Examiner*—Adolf Deneke Berhane
*Attorney, Agent, or Firm*—Merchant & Gould P.C.

[57] ABSTRACT

A frequency dependent controller utilizes a loosely coupled transformer, which controller is adapted to change the operating characteristics of the transformer by varying its operating frequency in accordance with the requirements of a load to be supplied with power. If the transformer is operated at a single frequency, the maximum current that can be delivered is limited by the reactance of the transformer. If the transformer is operated over a frequency range by the controller, the maximum current and other operating characteristics of the transformer are a function of both the magnetic shunt and its then current operating frequency. Frequency control of a loosely coupled transformer permits precision electronic regulation of the transformer's operating characteristics and is suitable for control of a variety of devices, such as gas discharge lamps, DC to DC converters, AC to DC power and high voltage supplies, motor control and variable heaters.

27 Claims, 23 Drawing Sheets

| FIGURE 2A | FIGURE 2B |
|---|---|
| FIGURE 2C | FIGURE 2D |

FIGURE 2

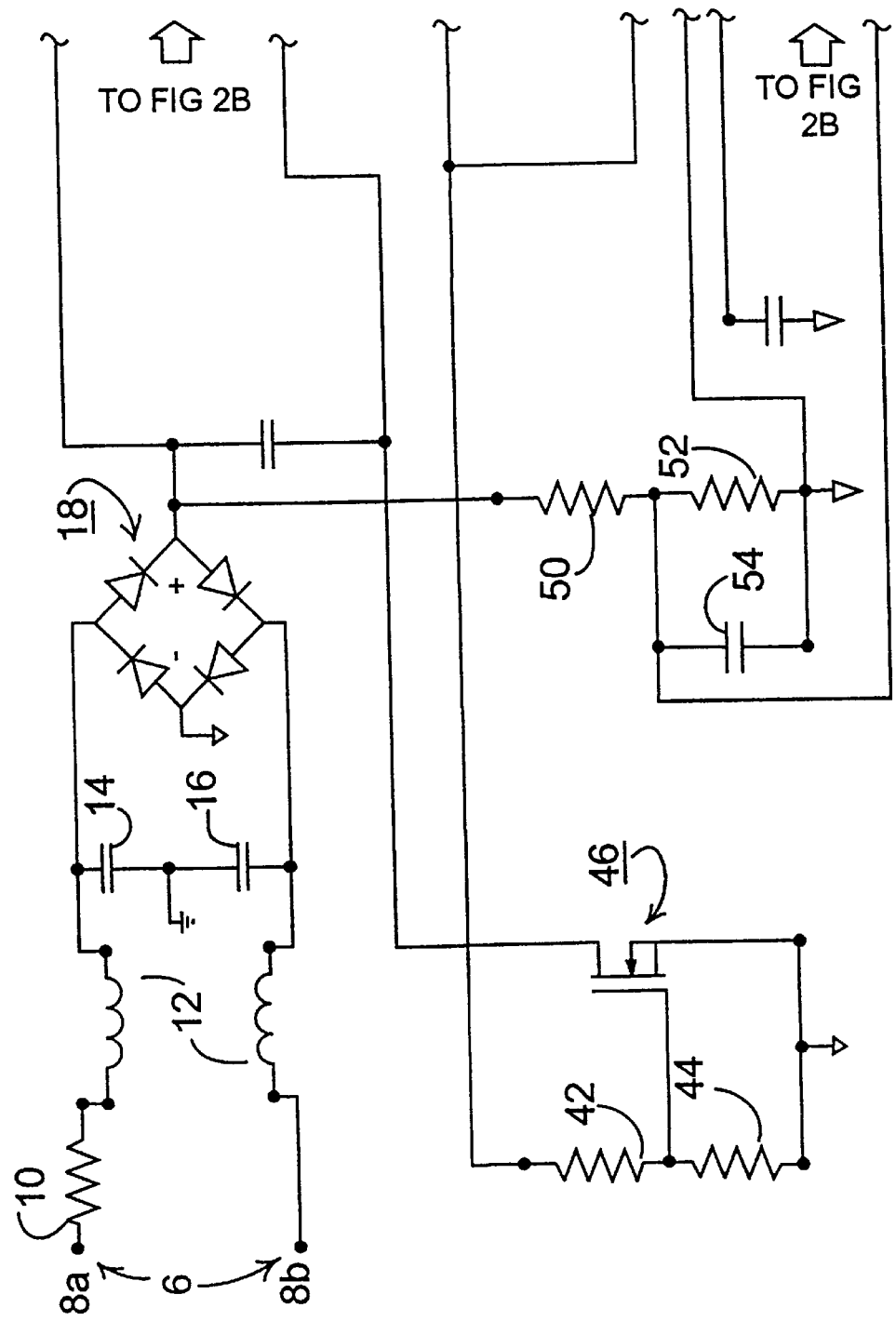

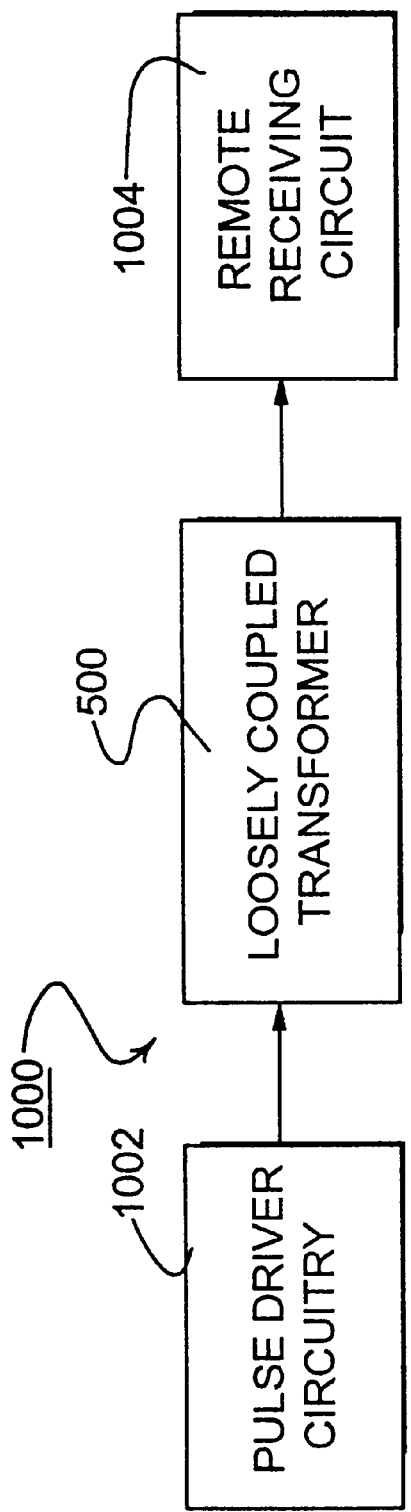
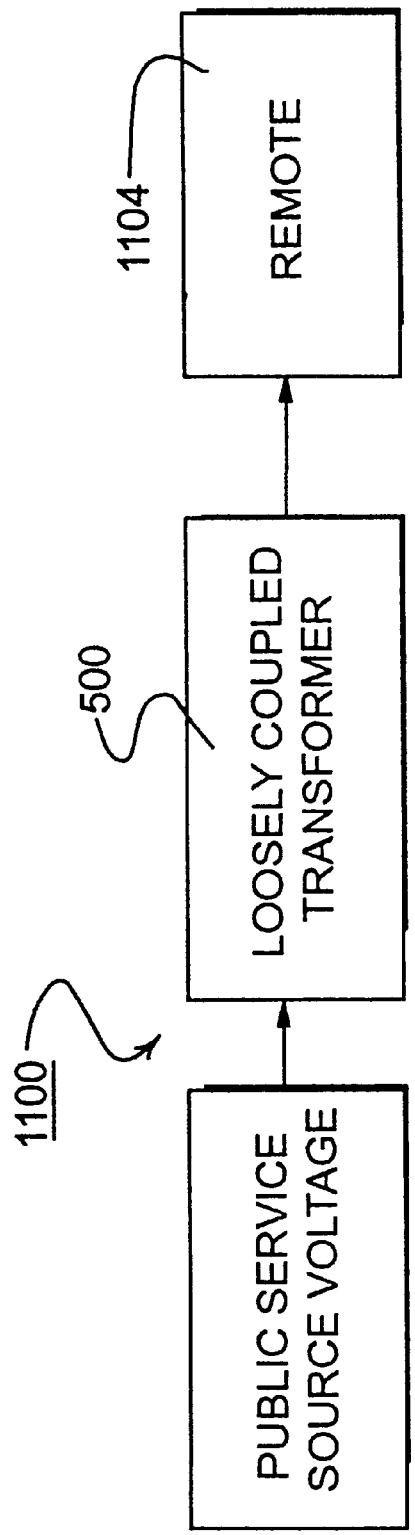

| FIGURE 12A | FIGURE 12B |
| --- | --- |
| FIGURE 12C | FIGURE 12D |

FIGURE 12

FREQUENCY MODULATED BALLAST WITH LOOSELY COUPLED TRANSFORMER

This is a continuation-in-part of U.S. patent application Ser. No. 08/982,974 filed Dec. 2, 1997 now U.S. Pat. No. 5,933,340 entitled, "Frequency Controller for a Loosely Coupled Transformer Having a Shunt with a Gap and Method Therefor," which is hereby incorporated by reference in its entirety.

BACKGROUND OF THE INVENTION

1. Field of the Invention

The present invention relates to a dimmable electronic ballast for gas discharge lamps and other devices, and more particularly to a dimmable electronic ballast comprising a loosely coupled transformer, in which current to the lamps is limited by adjusting the frequency of the waveform in the primary winding of the loosely coupled transformer.

2. Description of the Prior Art

An electronic ballast is used to convert commercial electrical power into a high voltage electrical signal sufficient to create and maintain a plasma in a gas discharge lamp. Typical examples of gas discharge lamps are fluorescent lamps and neon lamps. Transformers are typically used in ballast circuits to boost the voltage across the lamps.

Shunted transformers (also generally known as loosely coupled transformers, or leakage transformers) are transformers having higher than usual leakage inductance. Where the intent in standard power transformers is to produce a transformer that is very tightly coupled, that is, to create a transformer with very low reactance, the opposite is true with respect to shunted transformers where the reactance resulting from a shunt is traded off for current limiting capability. The geometry of the transformer core, and the nature of the windings of the coils, are factors that can affect the leakage inductance. All known transformer designs have at least a small amount of reactance, thus the concept of a leakage transformer is based on a relative scale.

As the terms are used herein, a "tightly coupled" transformer is considered to be one in which a very high percentage of the magnetic flux developed in the transformer's primary winding is delivered to its secondary winding. See pages 223, 224, 234, 235 and other general information in Electronic Transformers and Circuits, 2nd Edition, by Reuben Lee, published in 1955 by John Wiley, New York, N.Y. For example, placing the primary winding of a transformer on top of its secondary winding or interleaving the windings will provide a tightly coupled transformer in which substantially all the flux developed in the primary winding "flows" in the secondary winding by physical definition.

A "loosely coupled" transformer, on the other hand, is considered to be a transformer in which a lesser amount of the magnetic flux developed in the transformer's primary winding finds its way to the secondary winding. This relationship can also be expressed in terms of a transformer's coupling ratio, as defined by Lee on page 235 of his aforementioned reference, where "k", the coefficient of coupling (which varies from 0 to 1) is determined from:

$$(I_2{}^2 Z_2/E_1 I_1)_{MAX} = k^2/2(1+(1-k^2)^{1/2} - k^2 \quad (1)$$

in which, "I" indicates current, "E" indicates voltage, "Z" indicates impedance, the "1" subscript refers to the primary and the "2" subscript refers to the secondary of a transformer under consideration. Ratio values for "k" below 0.90 are considered to be loosely coupled with ratio values above 0.99 (an arbitrary dividing line) considered to be tightly coupled.

In addition to using magnetic flow as a measure of coupling, it is also possible to ascertain coupling using the inductance exhibited by the primary when the secondary is open and when it is shorted. The condition of the secondary winding circuit, open or shorted, determines the amount of current flow and, derivatively, the inductance exhibited by the primary winding. The ratio of the primary winding inductance under these two extremes gives rise to another form of coupling measurement as shall hereinafter be further described.

Leakage transformers may be gapped or ungapped, depending on the overall design and electrical characteristics. Loosely coupled shunted transformers having an air gap in one of their legs function in the following fashion. Typically, a E-shaped or multi-legged magnetic core is employed with the air gapped leg having a specific magnetic reluctance determined in part by the size of the air gap. One of the non-shunted legs holds the primary winding and the other non-shunted leg holds one or more secondary windings. The shunt is not usually provided with a winding.

The loop including the gapped leg has a fixed reluctance that is significantly higher than that of the secondary loop when the secondary is at low load or is entirely unloaded. In fact, at low load, the secondary winding magnetic loop will have most of the flux flowing through it and the secondary voltage will be high. As the load increases, the reluctance of the secondary loop increases and the secondary voltage decreases. As the secondary load approaches a short or is actually shorted (secondary voltage is zero), the majority of magnetic flux now flows through the gapped leg as its magnetic reluctance is lower than the high reluctance of the secondary winding loop. Thus, at low secondary voltage, the current is high, but limited to a value determined by the reluctance of the gapped leg.

There are basically two types of variable leakage reactance transformers used to control or limit current flow. As described in U.S. Pat. No. 4,123,736 to Brougham entitled LEAKAGE REACTANCE TRANSFORMER, they are commonly referred to as the moving coil type and the moving shunt type. The moving coil type transformer relies on moving one of its windings relative to the other to adjust leakage reactance. In the shunted type transformer, a steel shunt is movably mounted on a frame located between spaced apart primary and secondary windings and is moved into and out of the space between the windings to vary the transformer's reactance. In both types of transformers, degrees of control are predicated on mechanical movement of a winding or a shunt and it is, therefore, difficult to achieve precision current control at a fixed frequency. Further, as noted in the Brougham reference, the costs of such transformers are relatively high, especially when higher cost arrangements are needed to overcome problems presented by wear, jamming and the lack of precision control.

In U.S. Pat. No. 4,187,450 to Chen for HIGH FREQUENCY BALLAST TRANSFORMER, a transformer is described that is particularly useful in conjunction with solid state, high frequency push-pull inverters for supplying power to discharge lamps. The Chen transformer comprises a pair of facing E-shaped core sections disposed adjacent to one another in a mirror image fashion with their corresponding legs aligned but with an air gap provided between the middle, non-touching legs of the core. The transformer is described as being wound in a special fashion to overcome prior art limitations of insufficient ballasting reactance (needed to overcome the negative impedance at startup exhibited by gas discharge lamps) and magnetic leakage.

This reference, however, does not teach any method of utilizing frequency or current control to regulate power or signals provided to the secondary of a loosely coupled transformer.

Another air gapped transformer is described in U.S. Pat. No. 4,888,527 to Lindberg for REACTANCE TRANSFORMER CONTROL FOR DISCHARGE DEVICES. In this prior art device for obtaining current limited control of gas discharge lamps, one leg of a three legged transformer is provided with an air gap and fixed reluctance. The transformer's reactance is varied by means of a separate control winding that varies the reluctance of the transformer leg on which it is wound as a function of a variable impedance included in a control circuit used to drive the control winding.

U.S. Pat. No. 5,192,896 to Qin for VARIABLE CHOPPED INPUT DIMMABLE ELECTRONIC BALLAST teaches an output transformer having a loosely coupled primary and secondary winding and a pair of slidable magnetic shunts. The Qin transformer is constructed from a pair of facing E-shaped ferrite cores having an air gap in its center leg. The primary and secondary windings are separated from each other by a pair of shunt housings in which the movable shunts are slidably mounted. By adjusting the position of the shunts, the parameters of the transformer can be adjusted to match the load requirements.

As described above, there were a number of prior art transformer arrangements that sought to take advantage of the inherent characteristics of shunted transformers by varying winding methods or positioning, using slidable shunts and adding control windings to various portions of such transformers. While these attempts at improving the results achieved by control or modification of reactance transformers did achieve better operating results or manufacturing costs, they still failed to yield the degree of precision, low cost, efficiency and versatility required by modem power transferring arrangements.

Co-pending U.S. patent application entitled, "Frequency Controlled, Quick and Soft Start Gas Discharge Lamp Ballast and Method Therefor," Ser. No. 08/982,975, describes an electronic ballast, and is hereby incorporated by reference in its entirety.

The brightness of a gas discharge lamp can be controlled by adjusting the output power of the ballast. Dimmable electronic ballasts typically use pulse width modulation (PWM) to control output power. In a typical PWM circuit, the width of a square wave pulse is adjusted so as to change the total power delivered to the load. It would be undesirable, in many designs, to vary the frequency because many ballast designs have a resonant output stage that helps boost the output voltage. The driving frequency for the output stage, including the transformer, of a PWM circuit is typically held constant to maintain the resonance.

It would therefore be desirable to have an electronic ballast design that is efficient and less expensive than current designs. It would also be desirable to have an electronic ballast design that does not require a resonant circuit in its output stage, so that frequency modulation can be used to control power instead of pulse width modulation. It would further be desirable to use a low cost leakage transformer in an electronic ballast design to control the output current.

SUMMARY OF THE INVENTION

The present invention improves on the prior art devices by providing a simple and inexpensive dimmable electronic ballast that takes advantage of the properties of a loosely coupled transformer. The circuit of the present invention employs frequency modulation in combination with the electrical properties of the loosely coupled transformer to control the electrical current through the load. By varying the frequency in the primary coil of the loosely coupled transformer, the current can be appropriately limited in the secondary coil through the inherent reactance of the transformer.

In contrast with many previous designs, the circuit elements of the present invention are not designed to maintain a resonance at the output. High voltages across the load are achieved by way of a step-up leakage transformer, which also provides an inductive reactance that is a function of the driving frequency. Thus, by adjusting the driving frequency, the current flow through the secondary coil (and hence the load) can be controlled.

It is, therefore an object of the present invention to provide a dimmable electronic ballast incorporating a loosely coupled transformer whose parameters can be adjusted electronically rather than mechanically.

It is a further object of the present invention to control the characteristics and response of a loosely coupled transformed by means of frequency control of the voltage applied to the transformer.

It is another object of the present invention to provide a versatile, cost effective, ballast circuit with a loosely coupled transformer that is suitable for a number of applications involving several types of loads.

The foregoing objects are achieved by the present invention through use of a loosely coupled transformer and frequency control of voltage applied to the transformer to thereby adjust the transformer's parameters in accordance with the load to be supported or controlled. In addition, frequency control of such a loosely coupled transformer can be utilized to transfer signals from one device to another while isolating the devices from each other with a predetermined maximum allowable current. The use of a non-mechanical, frequency controller to adjust the parameters of a loosely coupled transformer enables finer, more precise and efficient control of the load.

BRIEF DESCRIPTION OF THE DRAWINGS

The present invention is explained in the context of use within an electronic ballast. A more complete understanding of the present invention can be obtained by considering the following detailed description of the preferred embodiments thereof in conjunction with the accompanying drawings, in which:

FIG. 5($b$) is a diagram of an alternative gapless embodiment of a loosely coupled transformer according to the present invention.

FIG. 10 shows a block diagram of the use of a loosely coupled transformer under frequency control in accordance with the present invention to supply a train of pulses to a remote receiving circuit; and FIG. 11 schematically illustrates use of a loosely coupled transformer under frequency control in accordance with the present invention to supply power to a sub-station or industrial load in accordance with the present invention.

DETAILED DESCRIPTION OF THE INVENTION

Figure 1:
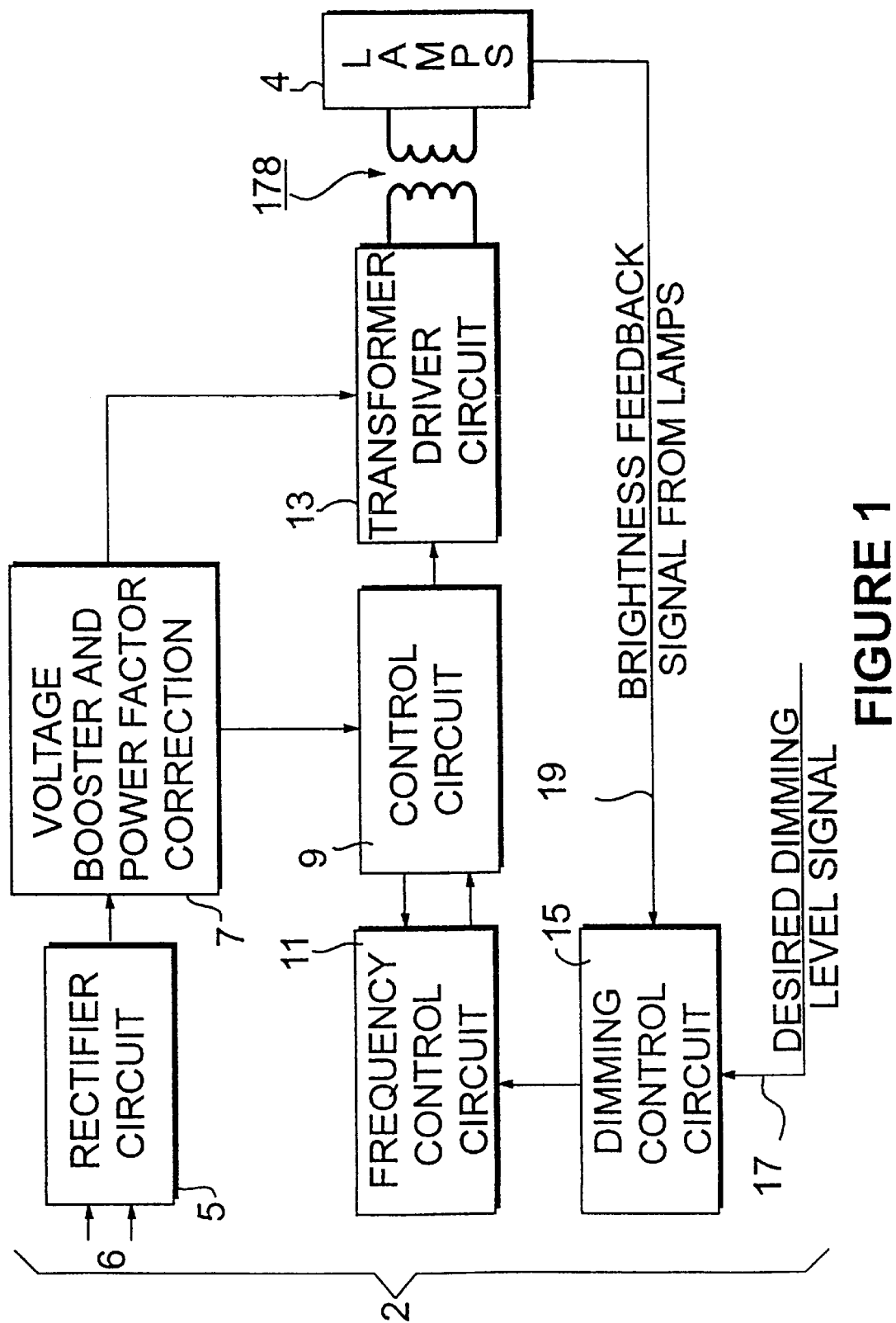
FIG. 1 is a block diagram of the main functional elements of a dimming electronic ballast in which transformer control in accordance with the present invention is employed.

Referring now to the drawings, wherein like reference numerals have been used in the several views to identify like elements, FIG. 1 illustrates a block diagram of an electronic dimming ballast 2. In its most general form, the electronic dimming ballast 2 may be used to control various loads, and as such the ballast 2 may also be referred to herein as a controller. The general nature of the controller, according to the present invention, is a frequency modulated (FM) circuit that utilizes the inherent current limiting characteristics of transformer 178 to control power to a load. Variations in frequency will control the current flow through the secondary winding of the transformer 178, and thereby limit the electrical power to a load.

One of the reasons that FM is applicable in this circuit is that there is no attempt to maintain a resonance in the output stage. Many prior controllers attempt to maintain a resonant stage, which typically requires operation within a narrow frequency band. While the present invention may have circuit dynamics with a resonant frequency, there is no attempt to excite and maintain such a resonance.

The load is shown as a lamp 4 in FIG. 1, but the load may also be an electric motor, heater, cooler, or another device as would be known to electrical engineers. The design is also applicable to current limiting DC to DC converters and AC to DC converters.

The controller comprises a power supply circuit, which may include a rectifier, amplifier, power factor corrector, filter, buffer, and other signal processing circuitry that is generally used in power supply circuits adapted for use with commercial alternating current (AC) power. The controller also comprises a voltage controlled oscillator (VCO), shown as 11 in FIG. 1, connected to the power supply circuit, to produce a frequency modulated (FM) output signal in response to a voltage input. The controller further comprises a loosely coupled transformer 178 having at least one primary winding and at least one secondary winding. The primary winding is electrically connected to the adjustable frequency output signal, in addition to being connected to other elements of the power supply. The secondary winding is electrically connected to supply current to the load. The transformer 178 has the general property shown in FIG. 7, wherein the current in the secondary winding is responsive to the adjustable frequency output.

A further description of FIG. 1 follows. A line voltage source 6, having a frequency and voltage level normal for the specific location of the world at which the ballast is being used, provides power to the ballast 2. The supplied voltage is rectified by circuit 5 to a continuous series of haversines, see FIG. 3, and passed on to a voltage booster and power factor correction circuit 7. The circuit elements of block 7 serve to raise the voltage level to a self-sustaining value appropriate for control circuit 9 and the gas discharge type of lamps 4 being used. Control circuit 9 forwards a reference voltage signal to the frequency control circuit 11, which adjusts the frequency of its output in accordance with that reference, subject to any changes in that output frequency called for and required by the dimming control circuit 15 through its desired dimming level signal 17. As shown in FIG. 1, the dimming control circuit 15 also receives a brightness feedback signal 19 from the lamps 4 which it compares to the desired dimming level signal 17 to derive a differential signal, whenever signals 17 and 19 are different, that is used to adjust the frequency of the voltage output by frequency control circuit 11.

The output from frequency control circuit block 11 is fed to control circuit 9 where it is used to produce a closely matched square wave voltage that is forwarded to transformer drivers circuit 13. The transformer drivers thereby created in block 13 are used to generate drivers for a special transformer 178, to be described hereinafter in greater detail, that is coupled to the lamps 4 whereby power is delivered to the lamps 4.

Figure 2B:
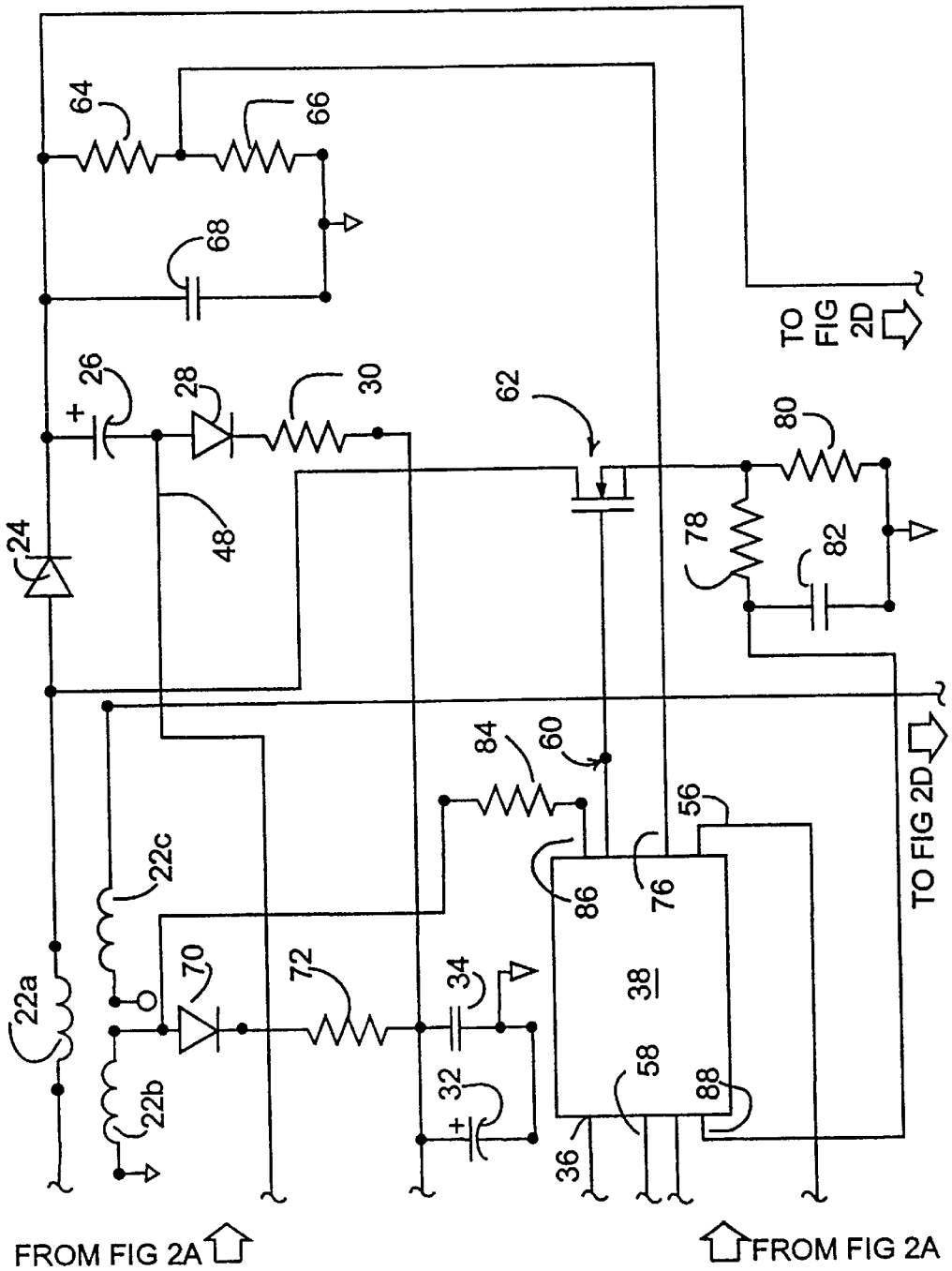
FIG. 2 is a schematic diagram of a dimming electronic ballast wherein a loosely coupled transformer under frequency control is used to supply power to a load comprising gas discharge lamps.
Figure 2C:
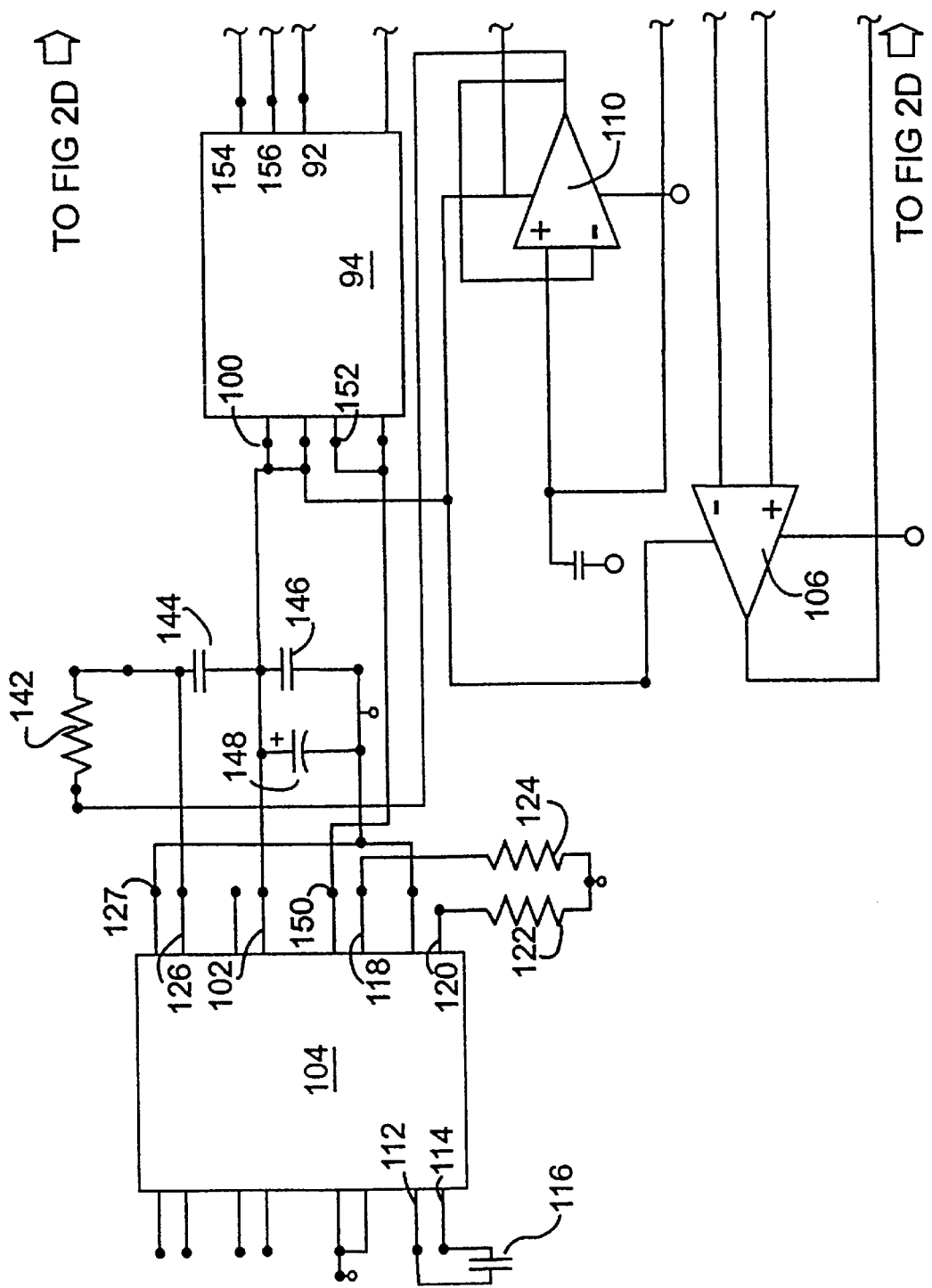
Figure 2D:
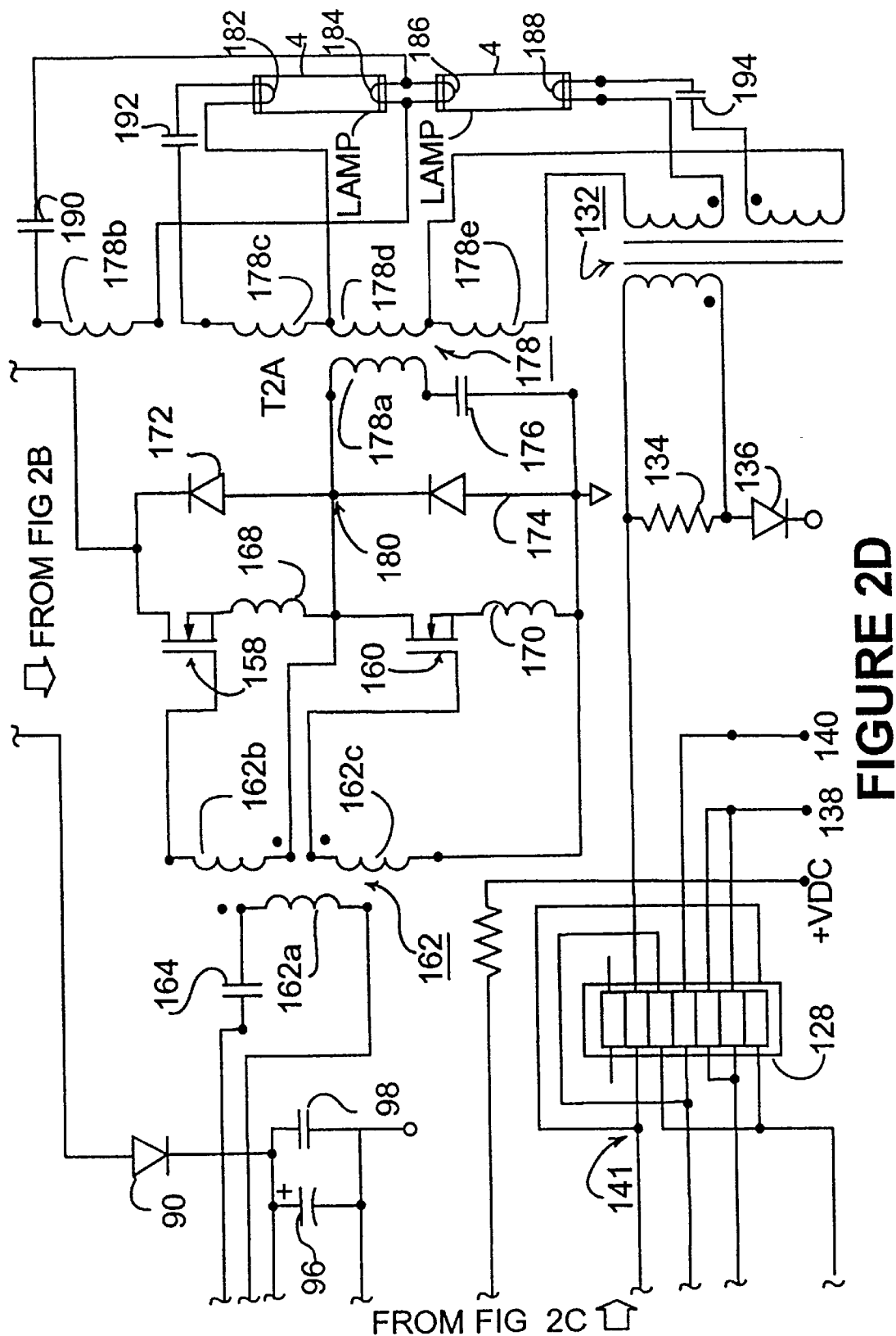

FIG. 2 illustrates in greater detail the components of a dimming electronic ballast 2 used for coupling a set of fluorescent lamps 4 to the source of electrical power 6 at input terminals 8a and 8b. The power source in this instance is 110 volts AC at a frequency of 60 hertz, the standard power conditions found in the United States. The depicted ballast 2, however, can accept input voltages in the range of 90 to 300 volts AC at frequencies of 50 to 60 hertz or 140 to 450 volts DC. This permits an electronic ballast made in accordance with the present invention to function satisfactorily, in full accordance with its specifications, in any country in the world under most power conditions that will be encountered.

Resistor 10 is connected in series with input terminal 8a and serves as a fuse or current limiting device. Resistor 10 represents a simple way to protect against overloads or excessive transients that would otherwise harm the ballast or compromise safety. Inductors 12 and capacitors 14 and 16 form an electromagnetic interference (EMI) or common mode choke filter that reduces EMI conducted to terminals 8a and 8b by limiting high frequency signals and passing only signals that have a complete path through the ballast 2.

Figure 3:
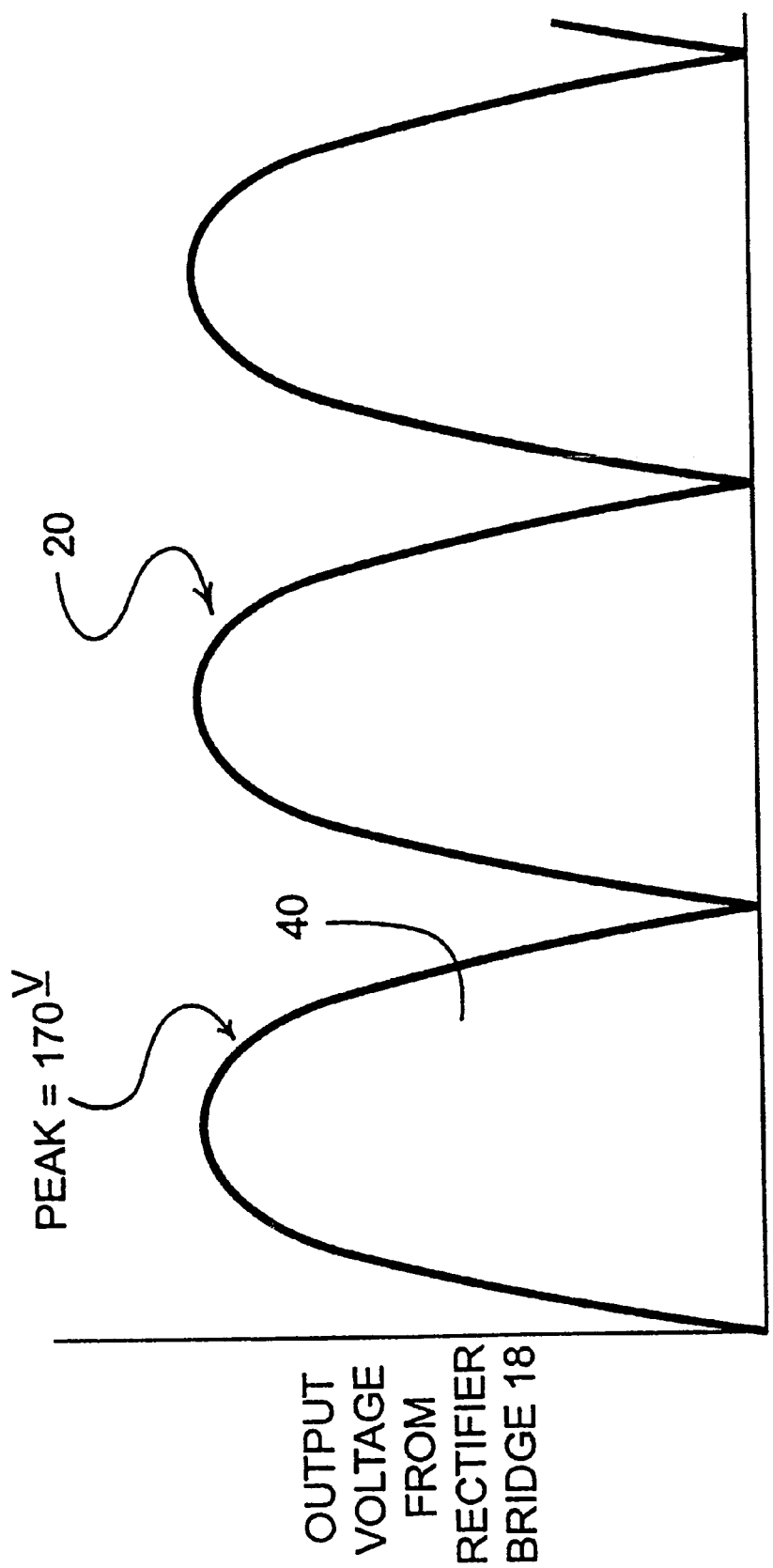
FIG. 3 illustrates the output voltage haversines obtained from a full wave rectifier bridge utilized in the electronic ballast shown in FIG. 2.

Full wave rectifier bridge 18 converts the input signal in standard fashion into the rectified output voltage signal 20 as shown in FIG. 3. The output voltage 20 of bridge 18 passes through several paths, the first including boost choke 22a, diode 24 which provides power to output FETs 158 and 160, as will be discussed hereinafter, capacitor 26, resistor 30, diode 28 and capacitors 32 and 34. Capacitors 32 and 34 are connected to input pin 36 of power factor chip 38.

Power factor chip 38 is a Motorola MC33262 integrated circuit chip which is more fully described at pages 3-455 to 3-457 of Motorola's Analog/Interface ICs, Device Data, Volume 1, Revision 5, 1995. Integrated circuit chip 38 is a high performance, current mode power factor controller that is designed to enhance poor power factor loads by keeping the AC line current sinusoidal and in phase with the line voltage. Proper power factor control keeps the apparent input power phase to ballast 2 close to that of the real power it consumes thereby increasing the ballast's operating efficiency in that respect.

When power is turned on, the first half-cycle or haversine 40 thereof output by bridge 18, see FIG. 3, reaches a value of 170 volts peak with an input voltage of 120 volts rms. Capacitors 26, 32 and 34 are initially discharged. Capacitors 26 and 32, when discharged appear shorted and when subjected to the initial haversine in an AC circuit, act as a voltage divider as determined by their respective capacitive values, for the initial haversine 40. In this instance, if the value of capacitor 26 is selected to be 24 microfarads and the value of capacitor 32 is chosen to be 48 microfarads, then capacitor 26, in the absence of other limits, would have two thirds of the peak of voltage 20 or 113.3 volts impressed across it and capacitor 32 would have one third of voltage 20 or 56.7 volts impressed across it. If the input voltage is as low as 90 volts, the voltage across capacitor 32 is still more than 30 volts, which is sufficient to turn on power factor chip 38. At the same time, resistor 30 limits the in-rush current to capacitor 26. As a result, the voltage division previously referred to across capacitors 26 and 32 actually occurs between capacitor 26, resistor 30 and capacitor 32, with resistor 30 serving the dual function of also limiting in-rush current on the first-half cycle. Capacitor 34 would have little effect on the voltage divider aspects of capacitors 26 and 32 since it is very small in value compared to capacitors 26 and 32.

Ordinarily, one third of the peak of voltage 20, a voltage of 56.7 volts in this instance, across capacitor 32 would be more than sufficient to burn it out. However, the combination of resistors 42 and 44 with FET 46 imposes a pre-set voltage limit across capacitor 32, which also protects IC chip 38. The values of resistors 42 and 44 are selected to have the voltage limit across capacitor 32 set to 15 volts in this instance. When the voltage across capacitor 32 exceeds its preset limit, FET 46 turns on pulling its base and line 48 to ground. Since line 48 is connected to one side of capacitor 26 and the base of diode 28, when line 48 goes to ground, capacitor 26 acts as an open circuit to further haversines and becomes a filter capacitor to the high DC voltage to power FETs 158 and 160. At the same time diode 28 is back biased thereby eliminating the further flow of current through diode 28 and resistor 30 and preventing capacitor 32 from being charged above its preset limit of 15 volts. This is true regardless of the value of input voltage in its nominal range of 90 to 300 volts AC, 50 to 60 Hertz.

In this manner, the circuit arrangement described above limits the total in-rush current at an input of 120 volts, where the voltage and current are 90 degrees out of phase with each other, the worst case, to 4.3 amps at an input of 120 volts AC. At the same time, the circuit insures that the appropriate voltage is applied to pin 36 of the power factor chip 38 to start it without ongoing loss of power even when the input voltage is at lowest expected value, in this case 90 volts AC. Further, even at this lowest possible input voltage, the circuit elements cooperate to provide an "instant on" capability for the power factor chip which gets turned on in the first half cycle of power over an input voltage range of 90 to 300 volts AC.

By way of comparison, the prior art method of using a resistor connected between the output of a ballast's power supply and the voltage supply pin of a power correction circuit, such as IC 38, would require a design tradeoff between power loss and turn on time over the expected input voltage range of 90 to 300 volt AC. For example, a 100 k ohm resistor connected to rectifier bridge 18 and across capacitor 32 at 300 volts AC input would cause a current of about 4 milliamps, draw about 0.9 watts and take approximately 0.25 seconds to charge capacitor 32 to the minimum level required to start IC 38. On the other hand, the same 100 k ohm resistor at 90 volts AC input would draw only 80 milliwatts, but take almost 2.0 seconds to turn on IC 38. As will be explained hereinafter, the availability of voltage to turn on the lamps is dependent upon operation of the power circuit chip 38. The longer IC 38 takes to turn on, the longer it takes for the lamps to be illuminated.

Further, if the power factor chip is initially turned on by connecting a resistor from the output of a full wave rectifier bridge or other DC source to the chip's input pin and a capacitor, such as capacitor 32, that resistor continues to dissipate wattage even when it is not needed after IC 38 is started. This usually wastes, depending on the size of the resistor selected, from approximately 80 milliwatts to 900 milliwatts and while that seems low when compared to other electronic devices, the overall saving in a setting where many lamps and ballasts are used, such as in a parking garage or large warehouse with hundreds of lamp fixtures, provides a considerable cost saving.

It is important to note that once appropriate power to chip 38 is provided, FET 46 is turned on as explained above, and as a result, diode 28 and resistor 30 are removed from the active circuit path. Since current is now supplied on a boost basis through coil 22b, diode 70 and resistor 72 to capacitor 32, resistor 30 isn't needed and the lack of current flow therethrough avoids power waste. The net effect is that resistor 30 is used during the first half cycle of operation to limit in-rush current and act as part of a voltage divider until FET 46 conducts after which it is effectively removed from the operational portion of the ballast's power supply circuit.

In addition, since the time constant of the resistor/capacitor combination at input pin 36 limits voltage buildup across the capacitor and to the input pin, it takes longer for the voltage across that capacitor to reach an appropriate level to turn on the power factor chip and the ballast. Conversely, the above-described circuit elements of the present invention insure that the ballast is turned on in the first half cycle of operation, especially for lower than usual input voltages, while that is not true in the prior art.

Once initiated, IC chip 38 is made self-supporting through the combined effects of associated circuit elements which use the output voltage 20 from rectifier bridge 18 to power chip 38 and the ballast control circuitry along with the lamps 4 with IC chip 38 serving to maintain the load power in phase with the input power. This is accomplished by forcing an inductive kick to occur in choke 22a, and derivatively in its secondary coil 22b, in phase with the haversines available at the output of full wave rectifier bridge 18. It should be noted that the IC chip 38 will shut down with no load because there will be no sustaining DC voltage.

The output voltage 20 from bridge 18 is passed to resistors 50 and 52, which form a voltage divider, and partially to capacitor 54 which helps filter voltage applied to input pin 56 of IC chip 38. Input pin 58 of IC chip 38 is held at ground. By appropriate choice of resistor values for resistors 50 and 52, the voltage on pin 56, which is in phase with the haversines of bridge output voltage 20, is typically set at around 2 volts peak. Internal to chip 38, that voltage is passed through a drive circuit (not shown) to appear on output pin 60. That voltage is applied to the gate of FET 62 and turns FET 62 on whenever the appropriate voltage level is reached during each haversine.

When FET 62 turns on, it very quickly pulls the right side of coil 22a to ground, and when it releases, causes an inductive kick in coil 22a and a reflective inductive kick in coil 22b, both of which are in phase with the haversines derived from the input power line. The induced voltage level is determined by the voltage divider formed by resistors 64 and 66. In this application, the values of resistors 64 and 66 are selected to produce a total value of 435 volts on capacitor 26. The total voltage is the result of the bridge output voltage 20 and the voltage resulting from the inductive kick in coil 22 for the time period that FET 62 is turned off. The 435 volts charge capacitors 26 and 68 to that level in phase with the input line voltage, or nearly so with the variance being approximately one degree out of phase. Capacitor 68 also serves as a high frequency filter.

Feedback from the junction of resistors 64 and 66 is provided to input pin 76 of IC chip 38 as a reference voltage Vset which is used to inform the internal circuitry of IC chip 38 that the correct DC voltage has been reached. When that occurs, the drive voltage is removed from pin 60 and FET 62 is permitted to turn off until the next haversine is present.

Since capacitor 26 may be drained when the ballast 2 is loaded, the resultant 435 volts is also used via feedback to keep IC chip 38 powered on as well as to provide power to the remainder of the ballast 2 and to the lamps 4. Feedback power to IC chip 38 is provided by coil 22b, through diode 70 and resistor 72 to capacitors 32 and 34. Capacitor 32 applies power to input pin 58 of IC 38 as previously described through the voltage limiting combination of resistors 42 and 44 and FET 46. Diode 70 and resistor 72 are inserted in the path from coil 22b to capacitors 32 and 34. Diode 70 serves to prevent discharge from capacitors 32 or 34 from causing unwanted current flow into coil 22b while resistor 72 serves to limit current in that circuit leg to capacitors 32 and 34 and acts as a filter in conjunction with capacitors 32 and 34 for pin 58.

The combination of resistors 78 and 80 and capacitor 82 serve to protect FET 62 by limiting and filtering the current signal drawn when FET 62 turns on. Resistor 80 is selected to have a low value, typically a few tenths of an ohm. Drive voltage is supplied to output pin 88 and resistor 80 serves to limit that to a current value that can easily be tolerated by FET 62. In addition, the voltage drop across resistor 80 determines the level at which FET 62 is turned off since it provides a delay that results from its RC combinational effect with capacitor 82. In addition, resistor 78 and capacitor 82 provide a high frequency filter capability for current flowing to pin 88.

On balance, the net effect of the front end portion of ballast 2 is to provide a precision, high voltage DC power supply with power factor compensation for an electronic ballast that turns on in its first half cycle of operation at reduced power consumption even when the input voltage level is at its lowest expected value. The front end portion also features a limited in-rush current capability that is automatically removed from the operational portion of the circuit thereby conserving power. The front end ballast portion also provides isolated control circuit power. In fact, the use of transformers to power the lamps 4 insures that there is no direct electrical connection from the input power source to the control circuit or the output (the lamps).

Current flowing through coil 22a causes current to flow in secondary coil 22c by transformer action. When coil 22a experiences the previously described inductive kick, a like and proportional increase in current flow is experienced in coil 22c. By selecting an appropriate turns ratio between coils 22a and 22c, the induced voltage in coil 22c can be set to any desired level. In this case, that level can be as low as 14 volts and as high as 40 rectified volts DC, depending on the contribution of the inductive kick to voltage generated in coil 22c and the load being driven by the ballast 2. As indicated by the dots in FIG. 2 alongside coil 22a, 22b and 22c, their phases are chosen accordingly.

The power for the control circuit portion of ballast 2 is derived from coil 22c and passes through diode 90, which prevents reverse current flow into the front end portion of ballast 2, to input pin 92 of integrated circuit chip 94, a Texas Instruments TPS2813 multi-function chip. The voltage is filtered for high frequency by capacitors 96 and 98. Input pin 92 serves as the input to an internal voltage regulator in IC chip 94. The output of that regulator is pin 100 which is held at a constant value of 11.5 volts by the regulator's action over the range of the 14 to 40 volts which appears on input pin 92. Output pin 100 is connected to input pin 102 of the CMOS integrated circuit chip 104, an RCA voltage controlled oscillator. Output pin 100, in the dimming version of ballast 2, is also connected to operational amplifier 106, an LMC6032.

Control of IC chip 104 is based on the capacitive value of capacitor 116 which is connected across pins 112 and 114 of IC chip 104 and the values of resistors 122 and 124. The value of resistor 122 determines the lower frequency operating limit of IC chip 104 while the value of resistor 124 determines its upper frequency limit. The voltage on input pin 126 determines the operating frequency of the output voltage, a DC square wave, on pin 150 of IC chip 104. If the voltage on pin 126 is zero volts, the output on pin 150 oscillates at its lowest frequency as determined by resistor 122. If the voltage on pin 126 reaches it highest value, then the output on pin 150 of chip 104 oscillates at its highest possible frequency as set by resistor 124.

As noted above, the values of capacitor 116 and resistors 122 and 124 determine the minimum to maximum frequency range of response for chip 104. If the voltage on pin 126 is zero volts, for example, then the values of resistor 122 and capacitor 116 determine the minimum frequency of the voltage on pin 150. If the voltage on pin 126 reaches its maximum value of $V_{cc}$, the voltage on pin 102, then the values of resistor 124 and capacitor 116 determine the maximum frequency of the square wave present on pin 150. Further, it should be recognized that the frequency control range is linear, that is, for example, a 10% change in voltage on pin 126 will produce a 10% change in the frequency of the voltage on pin 150. Alternatively stated, the values of resistors 122 and 124 also determine the slope of the frequency range from its minimum to maximum values.

A set of matched resistors 128 is coupled between operational amplifiers 106 and 110 and a dimming reference voltage source 130 that is comprised of current sensing coil 132, resistor 134 and diode 136. Resistor set 128 is a set of equivalent valued resistors that are matched to a tolerance of 50 parts per million which creates a very good differential amplifier when used in conjunction with amplifiers 106 and 110. As used with resistor set 128, the resultant differential amplifiers 106 and 110 have a very high common mode rejection ratio which is important since the lines going out to the dimming control may run long distances and the resulting voltage variations, if slight, will need to be accounted for by the ballast control circuitry.

Voltage from a dimming switch (not shown) that is located near the lamps to be controlled, is applied across terminals 138 and 140. That voltage is applied through resistors in set 128 to the inputs of differential amplifier 106. The output of amplifier 106 is fed, again through one of the set 128 resistors to a summing point 141 and from there to the positive input 1 of differential amplifier 110. At the same time, a reference current induced by current in the high voltage lines to one of the lamps which is on or illuminated, is derived by transformer action in coil 132 and forwarded to a resistor in set 128 and the resultant voltage is also passed to summing point 141 and input 108*b* of amplifier 110. The actual voltage on input pin 108*b* is, in this case, the average of the dimmer voltage and the lamp reference voltage as derived from coil 132. If the dimmer voltage is assumed to be 3 volts and the lamp reference voltage is assumed to be 3.5 volts, then the average voltage is 3.25 volts and that is what is applied to input 108*b* of amplifier 110.

The output of amplifier 110 is fed through resistor 142 to input pin 126 of chip 104 thereby changing the voltage on pin 126 and the operating frequency of the voltage on output pin 150. This will cause a change in the voltage applied to and the brightness of the lamps 4, raising or lowering the reference current developed in coil 132 as desired. When the brightness called for by the voltage across terminals 138 and 140 is reached, the output of differential amplifier 110 no longer changes from the value called for by the dimmer and pin 126 is then left at a constant voltage. In the above example, this would mean that the voltage from the dimmer is at 3 volts and the lamp reference voltage is also 3 volts. That makes their sum 3 volts which holds pin 126 of chip 104 constant, that is, until a change in brightness is called for.

Figure 13:
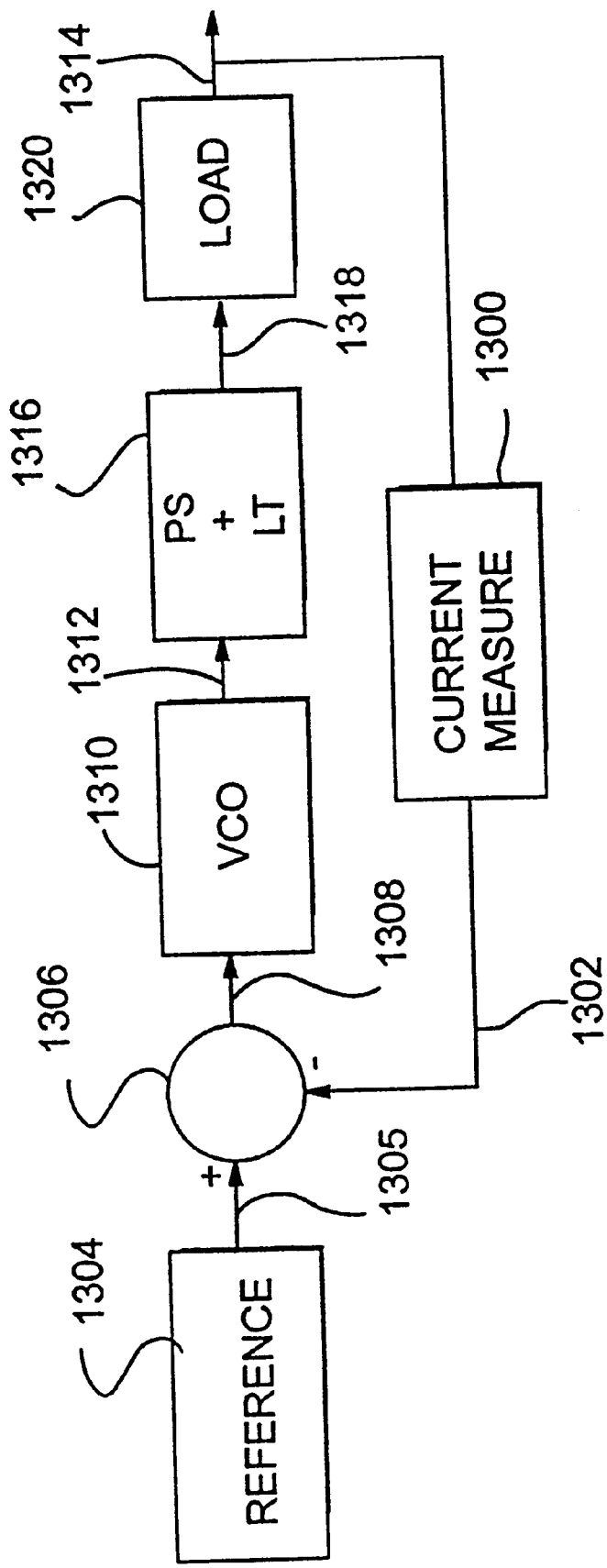
FIG. 13 is a block diagram schematic of a feedback control loop according to the present invention.

A simplified block diagram of a negative feedback control loop, such as the one embodied in FIG. 2, is shown in FIG. 13. Electrical current, depicted diagrammatically as flowing in line 1314, is measured by a current measuring device 1300. Examples of current measuring device 1300 are a coil or transformer, and one example is shown as element 132 in FIG. 2. Device 1300 generates a signal, typically a voltage, depicted diagrammatically as flowing in line 1302, that is connected to a summation circuit 1306 which is preferably an op-amp. A reference signal source 1304 is preferably a potentiometer connected to a voltage source. Source 1304 produces a reference signal 1305, preferably a voltage, that is connected to the summation circuit 1306. In a dimmable ballast embodiment, the reference voltage 1305 is typically set by a user to adjust the brightness of the lamps 4, which is shown as load 1320 in FIG. 13. In an alternative embodiment, the reference voltage 1305 may be a fixed value that is indicative of a desired brightness setting.

The summation circuit 1306 subtracts the signal 1302 from the reference signal 1305 to arrive at a command signal 1308 that is connected to the input of the voltage controlled oscillator 1310. The output 1312 of the voltage controlled oscillator 1310 has its frequency adjusted in accordance with the command voltage 1308. The frequency controlled output 1312 is used to drive a power supply circuit having a leakage transformer, shown as block 1316 in FIG. 13. The leakage transformer, shown as 500 in FIG. 5, limits current based on the frequency of the output 1312, thus limiting current to the load 4. Thus, line 1318 in FIG. 13 represents a current limited electrical signal that is connected to a load 1320, which is equivalent to the load 4 for the case of gas discharge lamps. Thus, the voltage controlled oscillator 1310, the leakage transformer 500, the load 4, and the current measurement device 1300 comprise parts of a feedback control system to maintain a desired current in the load 4.

In an alternative embodiment, shown in FIG. 12, the feedback control is eliminated in favor of an open-loop control system. The open-loop embodiment does not have the functional equivalent of block 1300 in FIG. 13. Instead, control of the voltage controlled oscillator, 1310 in FIG. 13, is based on the reference signal 1305 without benefit of the feedback reference 1302. In many applications, an open-loop embodiment gives adequate performance and may be preferable due to its lower cost.

The embodiment shown in FIG. 12 has a similar electronic circuit architecture to the embodiment shown in FIG. 2. In FIG. 12, part CD4046 is a voltage controlled oscillator, such as described in block 1310 of FIG. 13. Components T1, Q3, and Q4 in FIG. 12 comprise a standard push-pull driver circuit that is part of the power supply in block 1316 of FIG. 13. The loosely coupled transformer in 1316 is shown as component T2 in FIG. 12 and T2A in FIG. 2. As can be observed from FIG. 12, there is no feedback from the secondary side of transformer T2.

A single ballast, according to the present invention, can properly supply from one to four lamps. In a closed loop feedback embodiment, such as shown in FIG. 2, the importance of the negative feedback action of the lamp reference signal 1302 is that the control system, shown in FIG. 13 places the appropriate voltage on all lamps to create the brightness called for by the dimmer regardless of variations from ballast to ballast or dimmer switch to dimmer switch. In essence this means that the same current in each lamp is controlled by a single ballast in response to the feedback resulting from the sum of the dimmer voltage 1305 and the reference voltage 1302. This removes the effects of component variations from ballast to ballast and predicates lamp brightness under dimmer control on responsiveness to the current feedback from coil 132, in the embodiment of FIG. 2, as summed with the dimmer voltage. The ballast 2 can also maintain brightness if one of the lamps 4 burns out.

Referring back to FIG. 2, at start-up or turn-on, capacitor 144, which is connected across pins 100 and 126, is discharged. When pin 100 comes up to its steady state or regulated voltage of 11.5 volts, capacitor 144 pulls pin 126 to the regulated voltage. Capacitor 144 is then charged to the regulated voltage of pin 100 by resistor 142 and the output of amplifier 110. This causes the ballast to sweep in from the highest frequency at start-up to a lower frequency as represented by the output voltage of amplifier 110. The lamps like this methodology because they ionize better at higher frequencies and the lower currents produced by transformer 162. Essentially, this is a soft or gentle start for the lamps which preserves their fluorescent coatings and promotes longer lamp life.

Capacitor 144, once charged, also serves as part of a low frequency filter for the control system as connected between the output of amplifier 110 and resistor 142 with resistor 142 to handle brightness switching transients. For example, when the dimmer control voltage is changed by a user, the output of amplifier 110 changes almost instantaneously. Similarly, if the lamp reference current developed in coil 132 changes, the output of amplifier 110 also changes almost instantaneously. If the control system were to respond as quickly as it ordinarily might to such changes, the lamps would flicker or flutter until the desired brightness was reached. To avoid this problem, capacitor 144, once charged, and resistor 142 form an RC circuit which imposes a time delay on the signal applied to pin 126 and thereby smoothes the brightness transitions. Thus, the combination of capacitor 144 and resistor 142, depending on where the control circuit is in the operating cycle can act as a low pass filter when running or as a differentiator at start-up.

The square wave voltage output of chip 104, as previously noted, is dependent on the voltage at pin 126. At initiation, pin 126 is relatively high and thus the frequency of the voltage at pin 150 is also high. Pin 150 goes to input pin 152 of chip 94. Internal to chip 94 are two buffers which place an output voltage on each pins 154 and 156 of chip 94. These outputs are of the same frequency, but shifted 180 degrees out of phase with each other. This has the effect of doubling the voltage across the primary winding 162*a* of pulse transformer 162. The internal buffers of chip 94 are driven by powerful drivers that are capable of providing pulsed current flow in the order of 2 amps into capacitive loads, the kind exhibited by a FET. This capability permits a relatively weak signal to be boosted so that the power FETs 158 and 160 can be turned on very quickly. This has the effect of minimizing transition losses, which are dependent on how fast the power FETs are turned on (in this application in approximately 40 nanoseconds). The FETs are selected to have the lowest possible "on-resistance" or impedance so that power losses through the FETs and in the ballast are kept to a minimum. Finally, chip 94 acts as a buffer between the low power CMOS implemented voltage control oscillator chip 104 and the power FETs 158 and 160.

The outputs from driver pins 154 and 156 are a set of very closely matched square waves whose edges are within 40 nanoseconds of each other with high pulsed drive (2 amp) capacity. The AC coupling effect of capacitor 164 permits the low impedance primary inductor 162*a* to be effectively connected to output pins 154 and 156. With this output, the control circuit will drive the primary side of closely coupled pulse transformer 162*a*, the signal amplitude of which is effectively doubled at secondary transformer windings 162*b* and 162*c* to plus and minus 11 volts by the out of phase output from pins 154 and 156. This effectively puts a 22 volt square wave across primary 162*a*. On the secondary side of transformer 162, this means that power FET 158 will have plus 11 volts applied across its gate and source while power FET 160 will have minus 11 volts applied across its gate and source. Since the FETs are selected with optimized values of minimal on-resistance when gate to source voltage is greater than plus 5 volts and off-resistance is maximal when gate to source voltage is less than minus 5 volts, they are each turned on and off very quickly by the plus and minus 11 volts applied across their respective gate and source by the secondary windings 162*b* and 162*c* respectively. This guarantees that the power FETs 158 and 160 are turned on and off very quickly which minimizes transition losses.

The secondary windings 162*b* and 162*c* are out of phase with each other by 180 degrees guarantying that the gate to source voltages generated therein that turn the power FETs on and off will also be out of phase by that amount. However, the edges of the generated voltages are so sharp and fast that there is a possibility that the FETs could be on at the same time, even if briefly, permitting the 450 volts present at point 166 to be conducted to ground. That would be unsafe and undoubtedly cause a problem in the ballast or pose a threat to a user. Accordingly, inductors 168 and 170 are connected from one side of each secondary winding to the source of the associated FET. as shown in FIG. 2, to impose a slight delay and thereby establishing a safe zone and insuring that the power FETs 158 and 160 are not on at the same time.

The center point of the power FETs 180 is connected to the primary side 178*a* of a unique transformer 178 that will be described hereinafter in greater detail. The on-off action of power FETs 158 and 160 drives point 180 between 450 volts and ground. Capacitor 176 provides AC coupling for primary winding 178*a*. Capacitor 176, which is connected to ground, charges to the middle of the voltage swing at point 180 or to 225 volts. This effectively causes an AC voltage to be impressed on primary winding 178*a* that varies between 0 to 225 to 450 volts. The diodes 172 and 174 are very fast and respectively serve to protect the FETs 158 and 160 from any inductive kick that results from abrupt voltage changes in the primary winding 178*a* caused by the power FETs shutting off.

Transformer 178 is an over-wound, current limiting type. When primary 178*a* turns on, transformer action causes voltage to be induced in secondary windings 178*b*, 178*c*, 178*d* and 178*e*. The voltage developed across secondary winding 178*d* during normal, steady state operation is approximately 280 volts rms. The main power for lamps comes from secondary winding 178*d*. Secondary windings 178*b*, 178*c* and 178*e* provide voltage to the lamp filaments 182, 184, 186 and 188. The secondary filament voltage developed by windings 178*b*, 178*c* and 178*e* is 5 volts rms. As shown in FIG. 2, secondary winding 178*b* is connected to filaments 184 and 186, secondary winding 178*c* is connected to filament 182 and secondary winding 178*e* is connected to filament 188.

At start-up, because it's over-wound, secondary winding 178*d* goes to approximately 470 volts rms, a voltage level that is needed to ignite the lamps and cause ionization of their internal gas. At the same time, secondary windings 178*b*, 178*c* and 178*e* provide approximately 9 volts to the filaments. As previously noted for start-up, the drive frequency is at its maximum value. At start-up, each of the capacitors 190, 192 and 194 can be considered as shorted and the result is that the voltage across the lamps from secondary winding 178*d* is at a maximum to help ionize the gas within the lamps and cause gentle lamp ignition. Operating frequency is then at its highest possible value for the control circuit portion and secondary 178*d* current is at its lowest value, holding the filaments are at an elevated voltage level which warms the lamps and helps get them started by promoting electron flow from the filaments.

Since gas discharge lamps are easier to ionize at higher frequencies, the start voltage profile presented to the lamps promotes what is called a "soft start." The starting voltage for the lamps is predetermined to be at an initial frequency of 100 KHz which is swept down to the operating frequency of a non-dimming ballast or to the frequency set point corresponding to the feedback provided by the dimming switch (not shown) and associated dimming circuitry. At the higher operating frequency, less current is drawn in the secondary and that means that less power is delivered to the lamps as a result of transformer 178 action. This "soft start" results in significantly reduced flickering and noise from the lamps during their start phase. In addition, the lower starting current reduces depletion of the phosphor on the sidewalls of the lamps thereby prolonging their life.

When the lamps start to draw current, secondary coil 178*d* goes to approximately 280 volts, a selected value that's typical for T8 type gas discharge lamps (this value would be different for other types of gas discharge lamps), due to the current limiting nature of transformer 178. The other secondary winding voltages and the filaments they are connected to simultaneously drop to 5 volts for the same reason. The frequency starts decreasing to wherever the control point has been set at terminals 138 and 140.

Nominally, after start, secondary windings 178*b*, 178*c* and 178*e* are at 5 volts and stay at the level even as the frequency for control purposes drops. However, the filament voltages are now dependent on the impedance presented by capacitors 190, 192 and 194 to the respective filaments they are coupled to. The value of capacitors 190, 192 and 194 is to select capacitive values that will drop actual filament voltages to about 2.5 volts for full light or minimum control frequency or 5 volts at 10 percent light, which corresponds to almost the maximum control frequency since at low light levels it is important to apply full voltage to the respective filaments to keep the lamps internally heated and thereby avoid lamp flicker.

Figures 4, 4A, 4B, 4C, 4D:
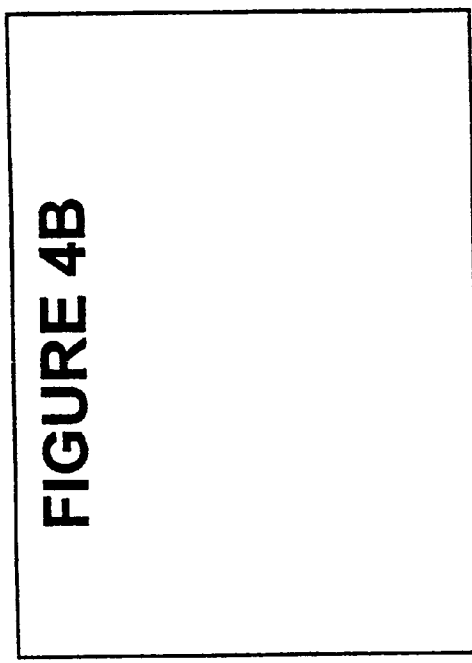
FIG. 4 depicts a schematic diagram of a non-dimming electronic ballast wherein a loosely coupled transformer under frequency control is used to supply power to a load comprising gas discharge lamps.
Figure 4A:
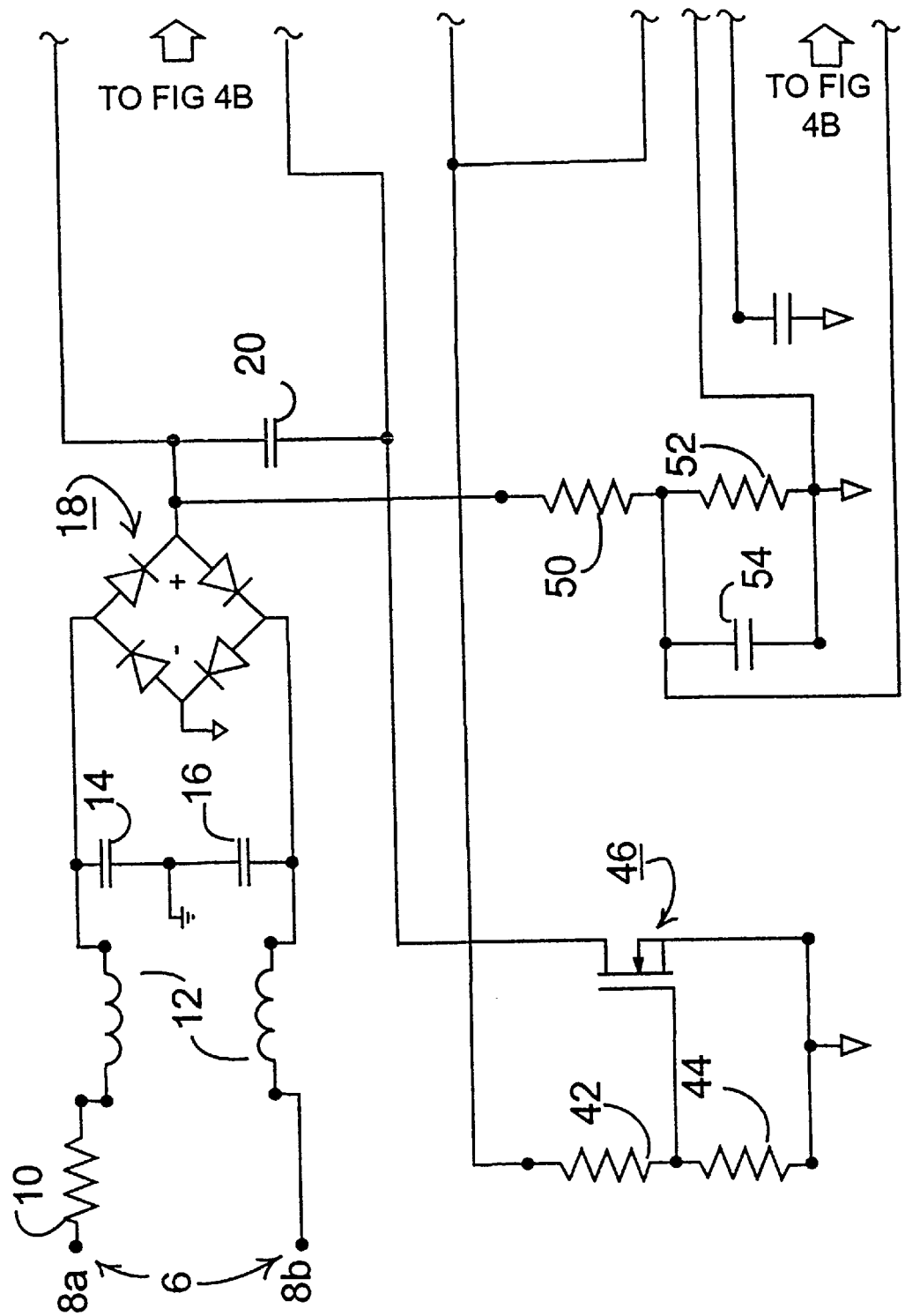
Figure 4B:
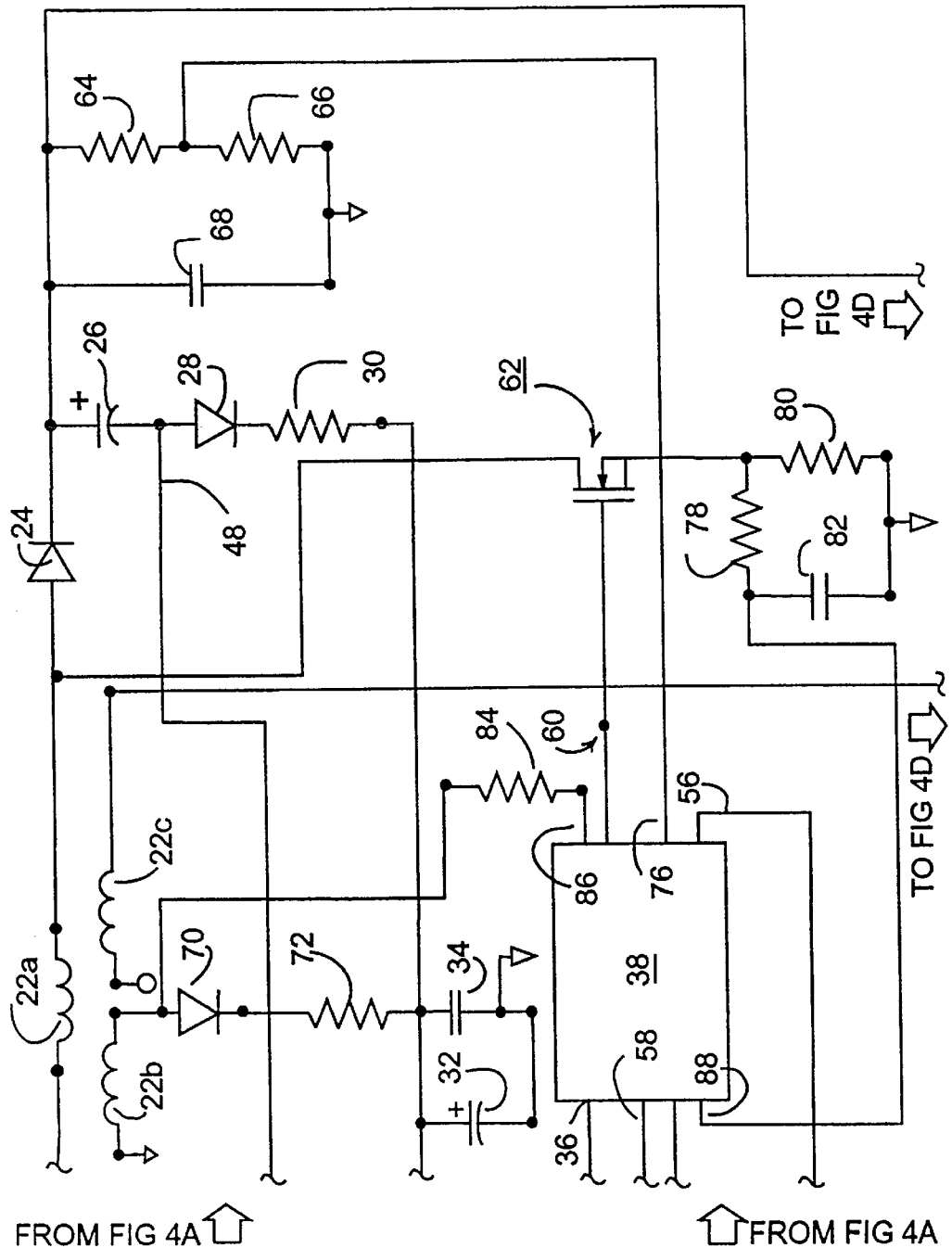
Figure 4C:
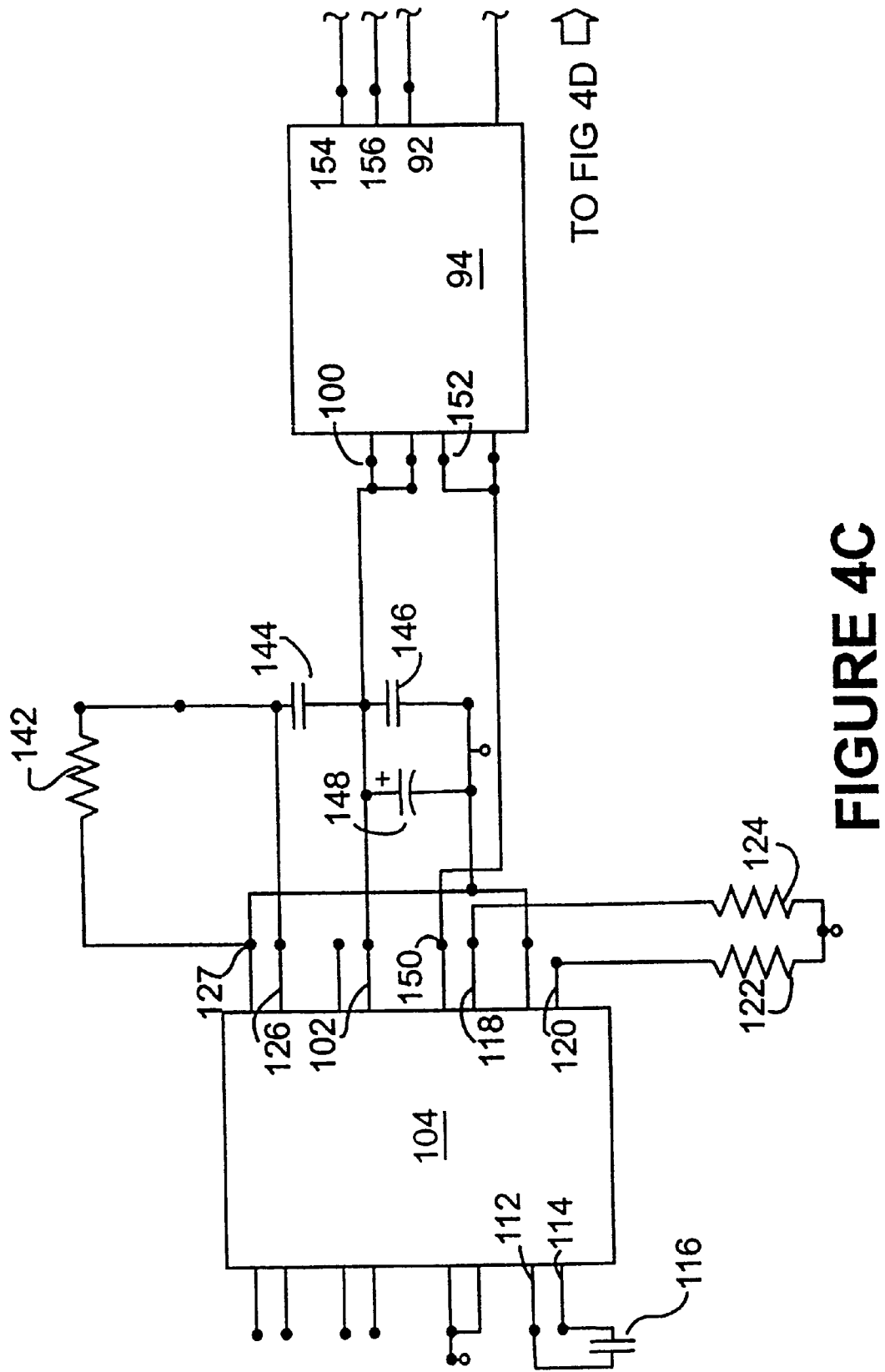
Figure 4D:
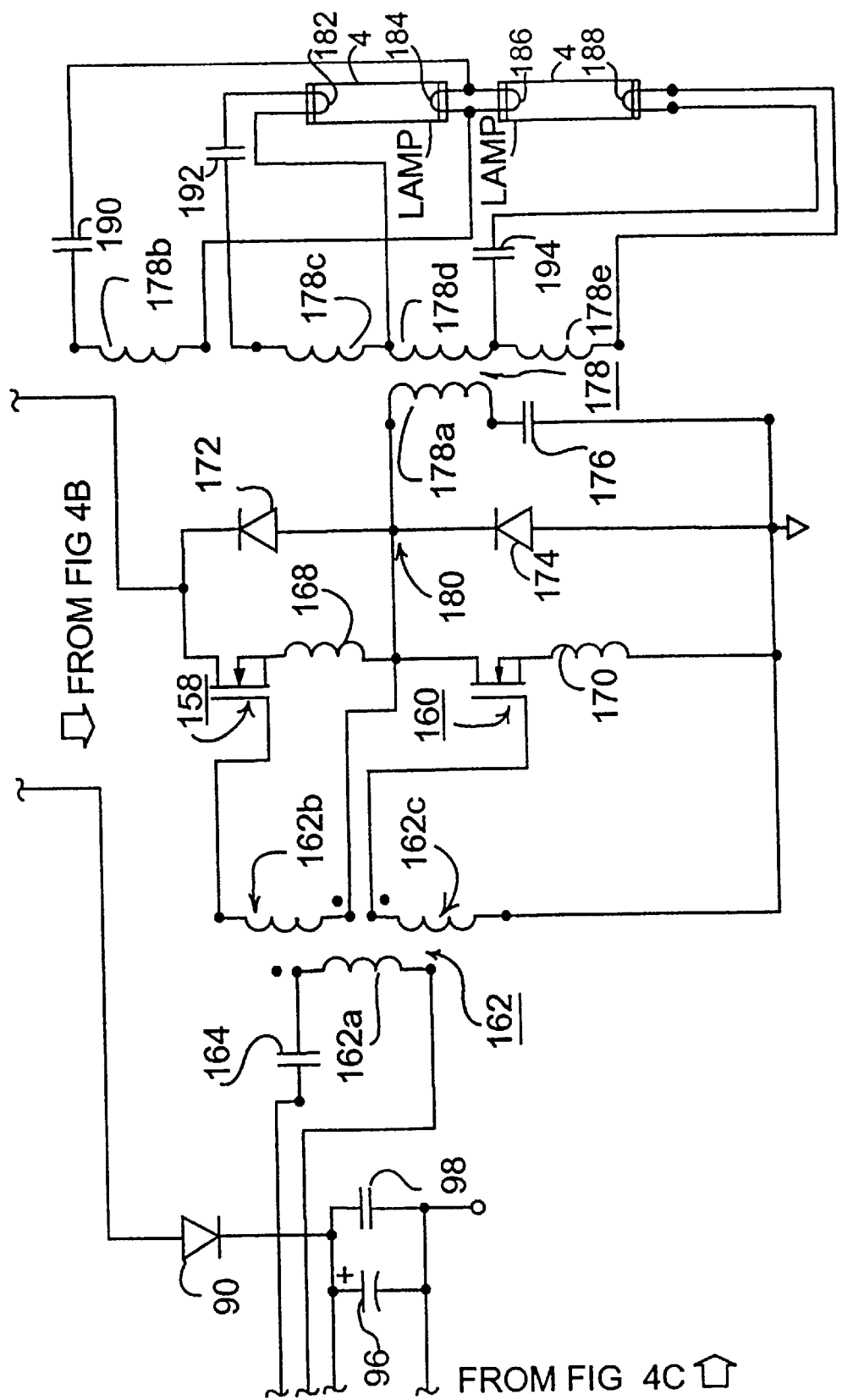

An equivalent, non-dimming electronic ballast 200 is shown in FIG. 4. The power supply portion of the non-dimming version of ballast 200, is identical to the power supply portion of the dimming version of ballast 2 shown in FIG. 2. The control circuit portion, of the non-dimming version of ballast 200 functions the same as the control circuit portion of the dimming version in all respects, except as follows. Differential amplifiers 106 and 110 are removed from the control circuit of ballast 2 together with the set of matched resistors 128 and terminal 138 and 140, compare FIGS. 2 and 4. The end of resistor 142 that was connected to the output of differential amplifier 110 is removed therefrom and connected to input pin 127 of IC 104, compare FIGS. 2 and 4 once more. Pin 126 remains coupled between resistor 142 and capacitor 144. At start, capacitor 144 is discharged, effectively a short, which pulls pin 126 to the top of its voltage range, insuring a maximum frequency output voltage on pin 150 to obtain the sweep in profile previously explained that the lamps favor. As capacitor 144 charges, the voltage to pin 126 eventually diminishes to its minimum value, and the frequency of the voltage at pin 150 drops linearly by the same percentage to the steady state operating frequency. As previously noted, the selected values of resistors 122 and 124 determine the maximum and minimum frequencies for the square wave voltage output on pin 150.

Also, in the non-dimming arrangement, the lamp current reference sensing circuit, comprising sensing coil 132, resistor 134 and diode 136, are also removed from the ballast 2 control circuit along with the lamp filament capacitors 190, 192 and 194, compare FIGS. 2 and 4. The resultant non-dimming ballast 200 formed by removal of the above enumerated circuit elements and reconnection of resistor 142 directly to IC 104 is otherwise identical to dimming ballast 2.

The parameters of transformer 178 are selected to accommodate several performance factors including the power to be delivered to efficiently drive lamps 4, the open circuit voltage required to initially turn on lamps 4 and the lamp current crest factor (the ratio of peak lamp current to the rms lamp current) which should be kept below 1.7. In addition, because of its current limiting capabilities, a short circuit or high current demand situation on the secondary side of transformer 178 drops apparent power delivered by transformer 178 to its secondary winding by an approximate factor of 10. There is an equivalent reduction of input power to the ballast as well.

The use of transformer 178, a frequency controlled, current limiting device, and frequency control of the ballast are the keys in providing an improved ballast. In addition, short circuit isolation is provided by the transformer which isolates the load from the ultimate source of power and limits short circuit current to a small fraction of what it would otherwise be.

Control is obtained by varying the voltage to input pin 126 of the voltage controlled oscillator chip 104 to produce an output drive voltage of essentially constant amplitude and variable frequency or holding the voltage (for a non-dimming version of the ballast) at a constant value that produces a voltage at a predetermined constant frequency. The net effect is that the current induced in the secondary side of transformer 178 is directly dependent on the frequency of the applied square wave. The use of such an arrangement limits current and voltage as a function of frequency and negates any need to employ pulse width modulation and its associated resonate circuit to clean up the voltage ripple. The present invention obviates that need while providing smoother, more efficient operating conditions.

Figure 5A:
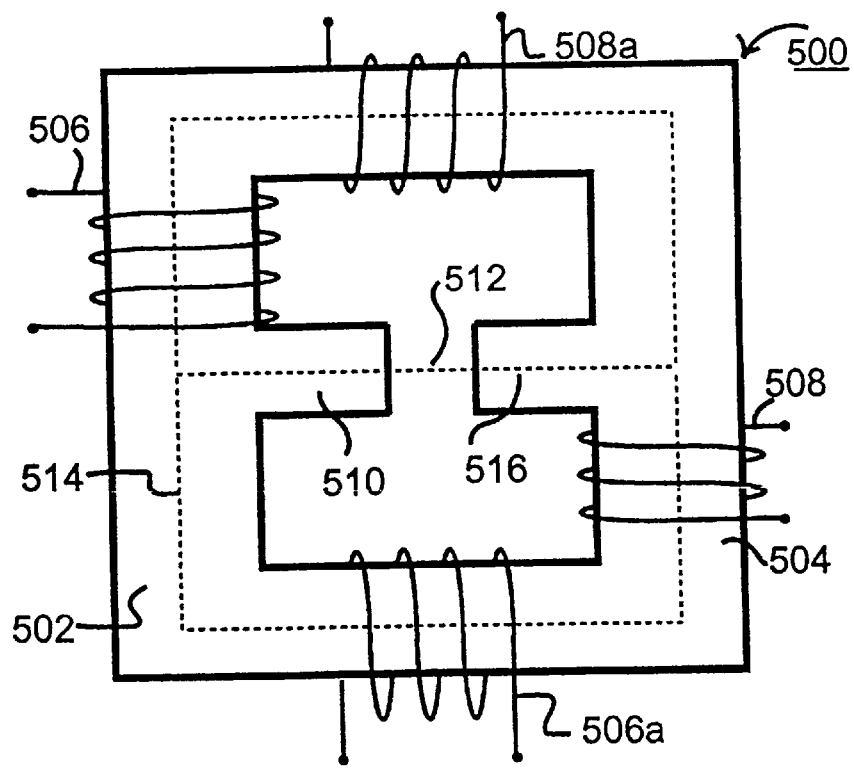
FIG. 5($a$) is a diagram of a loosely coupled transformer of the type incorporated in the present invention.
Figure 5B:
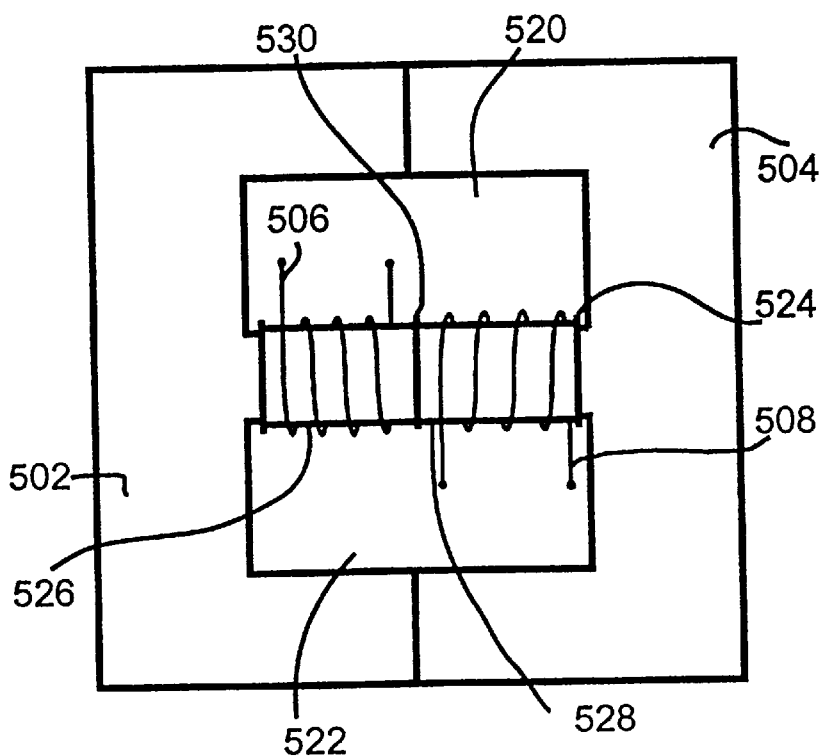

In a loosely coupled transformer, the concept of leakage inductance is a mathematical way to account for the less than theoretically possible magnetic coupling between its primary and secondary windings. FIGS. 5(*a*) and 5(*b*) depict loosely coupled transformers. The transformer core consists of two E-shaped, facing ferromagnetic members 502 and 504. The center leg is defined by two opening in the core, shown in FIG. 5(*b*) as 520 and 522. The center leg of the core may be constructed to include a gap, as shown in FIG. 5(*a*), or the center leg may be gapless, as shown in FIG. 5(*b*). The primary and secondary coils (506 and 508, respectively) may be located at various positions on the perimeter of the core (see also 506*a* and 508*a*), as shown in FIG. 5(*a*). Alternatively, the primary and secondary coils 506 and 508 may be located in a spaced apart relation along the center leg or member, and wound through two openings in the core as shown in FIG. 5(*b*).

In the embodiment of FIG. 5(*a*), the center portions of the E-shaped core forms a shunt 510 which has an air gap 512 of predetermined, suitable width. Those having skill in this art will recognize that the gap 512 in shunt 510 can also be formed of different material than air; for example, a dielectric material or even a fluid mixture of predetermined characteristics. Further, it has been found through experimentation that an appropriate leakage inductance can be achieved without a gap. An example of a gapless design includes a primary and secondary winding located on a center leg of a core, and spaced apart from each other.

A plastic bobbin 524 is preferably used to hold the windings. Wire is wound directly on the bobbin 524, which is then inserted on the center leg. After insertion, the ferromagnetic core is bonded together, thus capturing the bobbin 524. In the preferred embodiment, the bobbin has a first section 526 for the primary winding 506 and a second section 528 for the secondary winding 508. By separating the winding into different sections, it has been found that the transformer will have relatively high efficiency, while still generating an appropriate leakage inductance. A separator 530 on the bobbin 524, preferably made of plastic and located between the first section 526 and the second section 528, is used to separate the primary winding 506 from the secondary winding 508.

In its usual operating state, case 2 as described hereinafter, the primary flux path for transformer 500 is around the periphery as indicated by dotted line 514. Under short circuit conditions, primary magnetic flux flow is through the shunt 510 and across the air gap 512, as shown by dotted line 516. Gap 512 can be varied as may be suitable for various applications to shift the reluctance and response of transformer 500 in accordance with the type of load and the control schema being used therefor. It should be noted that the specific shape of the transformer core is not limited to the depicted E-shape and that an elliptical, circular or rectangular or other configuration can be employed in a controller according to the present invention with the shunt placed in the core's outer periphery or internal thereto as may be desirable. For those having an interest in further and more specific details of transformers, including those of loosely couple transformers, reference should be made to the aforementioned Lee reference and in Transformers For Electronic Circuits by N. R. Grossner, second edition, published 1983 by McGraw-Hill, New York, N.Y.

Figure 6:
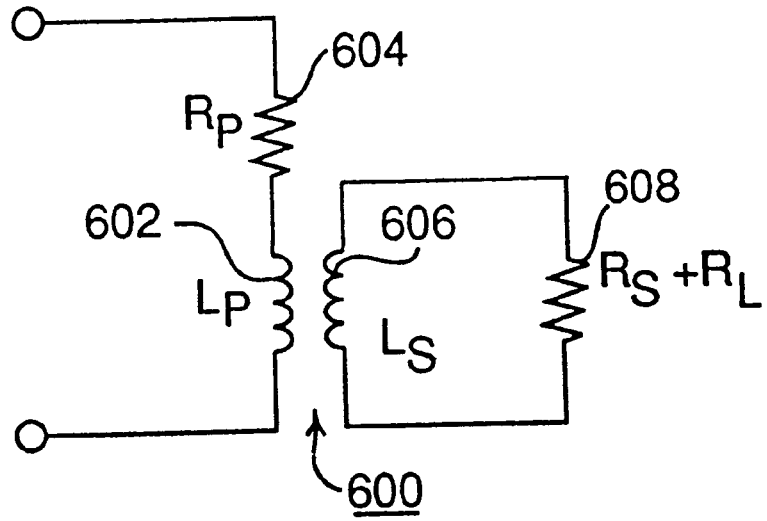
FIG. 6 shows an equivalent model circuit of a loosely coupled transformer as utilized by the present invention.

An equivalent model representation of the loosely coupled transformer 500, used in accordance with the present invention is shown in FIG. 6. The inductance $L_P$ of the primary side of transformer 600 is considered to be entirely included in winding 602 and its resistive component $R_P$ is considered to be entirely included in resistor 604. Thus, for purposes of modeling and analysis, the primary coil is divided into a purely inductive component and a purely resistive component. On the secondary side, winding 606 is considered to represent the secondary inductance $L_S$. The load 608 is assumed to be purely resistive for modeling purposes, consisting of the secondary winding resistance $R_S$ and the load resistance $R_L$.

The operating characteristics of this model and the coupling of transformer 500 are determined as follows. Assuming a turns ratio of 1 to 2, a step-up transformer, the inductance $L_P$ of the primary and the inductance $L_S$ of the secondary are measured when the secondary is open circuited and short circuited. With the secondary of a test (loosely coupled) transformer open, the apparent inductance of the primary $L_{PO}$ was measured at 40 millihenries. With the secondary of the same test transformer shorted, the primary $L_{PS}$ was measured at 4 millihenries. The inductive ratios for this primary as given by:

$$\text{Inductive Coupling Ratio} = L_{PO}/L_{PS} \qquad (2)$$

indicated a coupling ratio of 10. It should be noted that the same ratio will be obtained by comparing secondary inductance under the same secondary open and short circuited conditions, taking the transformer's turn ratio into account. As a general rule of thumb, an inductive coupling ratio below 10 is considered to be "loose", while an inductive coupling ratio above 30 is considered to be "tight." As implemented in accordance with the present invention, the inductive coupling ratio of a transformer should vary between 10 and 30. Alternatively stated, from 80% to 99% of the magnetic flux developed in the transformer's primary winding, depending on the operating characteristics of the transformer with respect to load requirements, should be flow through the transformer's secondary winding. This range is intended to encompass transformers with the electrical characteristics generally shown in FIG. 7.

Many variations of a leakage transformer are possible. Skilled artisans will appreciate that several factors can affect the inherent leakage inductance of a transformer, including the shape of the core, the placement of the windings, the size and shape of the gap (if any), and the nature of the windings.

There are three basic cases of operation that can be used to define or describe the operating characteristics of transformer 500. For purposes of this description, it is again assumed that transformer 500 is overwound so that a 2 to 1 turns ratio exists; that is, the transformer acts as a step-up device in which the input voltage V is doubled across the secondary winding 606. It is certainly within the scope of the present invention to employ a loosely coupled transformer which is underwound (step-down) or which has a unity turns ratio. The step-up type is used here for illustrative purposes only. For purposes of the simplified transformer model to be discussed, it is further assumed that transformer 500 is "perfect" (no operating losses, $R_P$=0) in operation.

In the first modeled case, load 608 is considered to be very large, essentially an open circuit. In that instance, the secondary current through load 608 and secondary winding 606 would be extremely small. Likewise, because transformer 500 is assumed to be "perfect", the primary current is also quite small. Thus, under open load conditions, transformer 500 acts to transfer a low amount of power from primary to secondary in accordance with its windings turn ratio.

Skipping to case 3, load 608 is now considered to be extremely small, essentially a short circuit. In such a situation, the power delivered to the load 608 is essentially zero (a very low or zero voltage multiplied by the secondary current) and $I_P$, the current in the primary, is determined by the voltage applied to the primary winding and its frequency. Since transformer 500 is considered to be perfect, the current in the primary is one half that of the secondary (with the assumed 2:1 turns ratio), and is, therefore, very low. Primary current flow due to winding 602 is a function of the input voltage and frequency and remains low as well as 90° out of phase with the voltage $V_P$. Thus, as the secondary approaches a short circuit condition, apparent primary current becomes low and drops toward zero amps.

Figure 7:
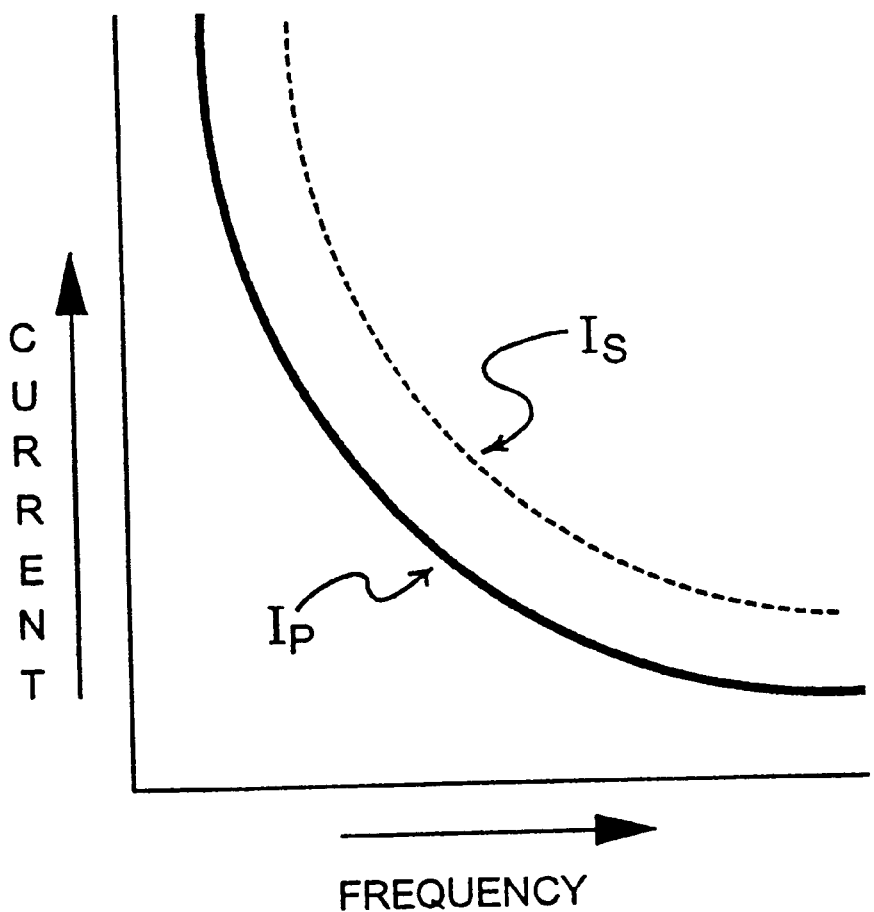
FIG. 7 depicts a plot of winding current in a loosely coupled transformer as a function of the frequency of the voltage applied thereto with respect to its usage in accordance with the present invention.

In the intermediate case 2, where the secondary load 606 varies between open circuit and short circuit conditions, the primary current $I_P$ is determined by the voltage $V_P$ impressed across the primary, its frequency and the short circuit inductance $L_{PS}$ of the primary winding 602. As shown in FIG. 7, at low frequencies, the winding current is relatively high and is relatively low at high frequencies since, at any given frequency, the inductance of the transformer windings, and therefore their impedance, varies inversely as a function of the frequency of the impressed primary voltage.

For example, with load 606 at 1200 ohms, an input voltage of 225 volts rms at a frequency of 100 kilohertz and an inductance $L_P$ of 4 millihenries and a primary resistance of 600 ohms, the primary current $I_P$ can be determined to be the primary voltage divided by its impedance $Z_P$:

$$I_P = V_P/Z_P \text{ (where } Z_P = 2\Pi F L_P + R_P) = 225/(100 \times 10^3)(6.28)(4 \times 10^3) + (R_P) = 225/(2512+600) = 0.0723 \text{ amps or approximately 72 milliamps.}$$

If the frequency in the intermediate case is increased to 200 kilohertz, primary current will drop to approximately 40 milliamps. If the frequency is decreased to 50 kilohertz, primary current increases to approximately 121 milliamps. Thus, changing the frequency of the transformer's driving voltage permits control of power delivered to the load and as a limit for operating current, both as a function of the frequency of the driving voltage applied to the transformer's primary winding. The change in driving voltage effectively alters the operating characteristics of the transformer by changing its inductive reactance and impedance.

The resultant relationship between transformer current and frequency is shown in FIG. 7 in which a plot of primary current $I_P$ and secondary current $I_S$ versus frequency of the impressed primary voltage is depicted. It should be noted that the position of $I_S$ with respect to that of $I_P$ will be a function of the turns ratio of the transformer's primary and secondary windings.

Figure 8:
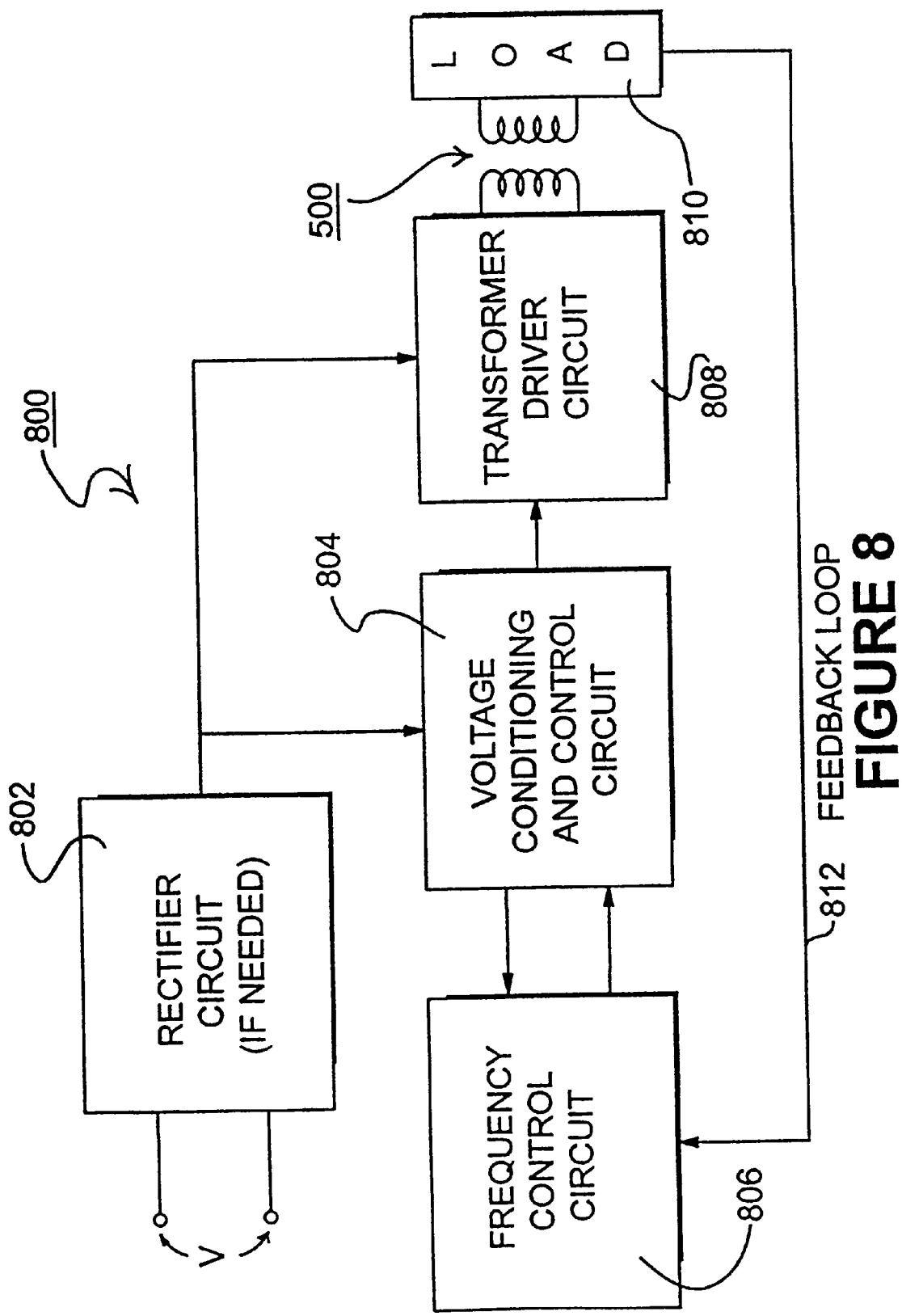
FIG. 8 shows a block diagram of a control arrangement which utilizes a loosely coupled transformer in accordance with the present invention.

The ability to control the characteristics of a loosely coupled transformer where its winding inductance, and therefore its impedance, can be varied as a function of frequency can be utilized in a controller or regulator as previously described in connection with ballast 2. A simplified general schematic diagram of such a controller is shown in FIG. 8. Line voltage V at a level and frequency commonly available is provided to a rectifier circuit 802 which rectifies that input as may be needed by the other circuitry and load. The rectified and possibly boosted or reduced voltage, to the extent such boosted voltage may be needed in a specific application, is supplied to a voltage conditioning and control circuit 804. Control circuit 804 forwards a reference voltage signal to the frequency control circuit 806, which adjusts the frequency of its output in accordance with that reference, subject to any changes in that output frequency as may be called for and required by the load 810 though its feedback loop 812.

The output from frequency control circuit block 806 is fed to control circuit 804 where it is used to produce a desired voltage type (e.g.—square wave, varying pulse train, haversines, etc.) that is forwarded to transformer driver circuit 808. The transformer drivers thereby created in block 808 are used to generate drivers for transformer 500 which is coupled to the load 810 whereby power is delivered thereto. It will be readily apparent, as explained above, that control of the transformer's operating characteristics can be suitably made dependent on the frequency of the voltage impressed upon transformer 500's primary winding. Furthermore, it can readily be seen from the relationship depicted in FIG. 7 and the controller schematic of FIG. 8, and as demonstrated in connection with the dimming version of ballast 2, that load feedback can be used to appropriately vary the frequency of the voltage impressed on the transformer to vary its winding currents and thereby achieve regulated and/or controlled transfer of waveforms, power or load control.

Figure 9:
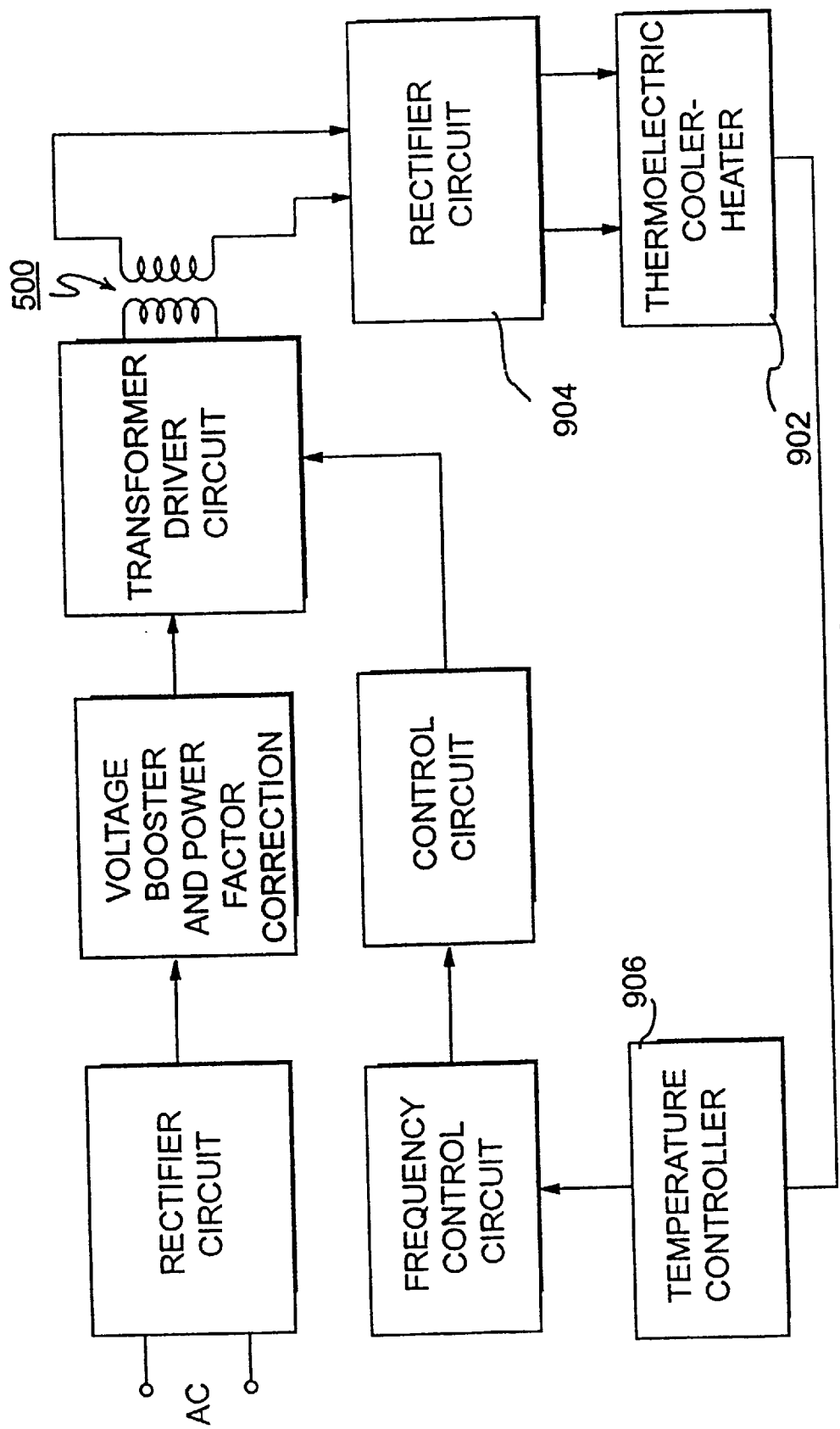
FIG. 9 schematically depicts use of a loosely coupled transformer under frequency control to supply power to a thermoelectric load in accordance with the present invention.
Figure 12A:
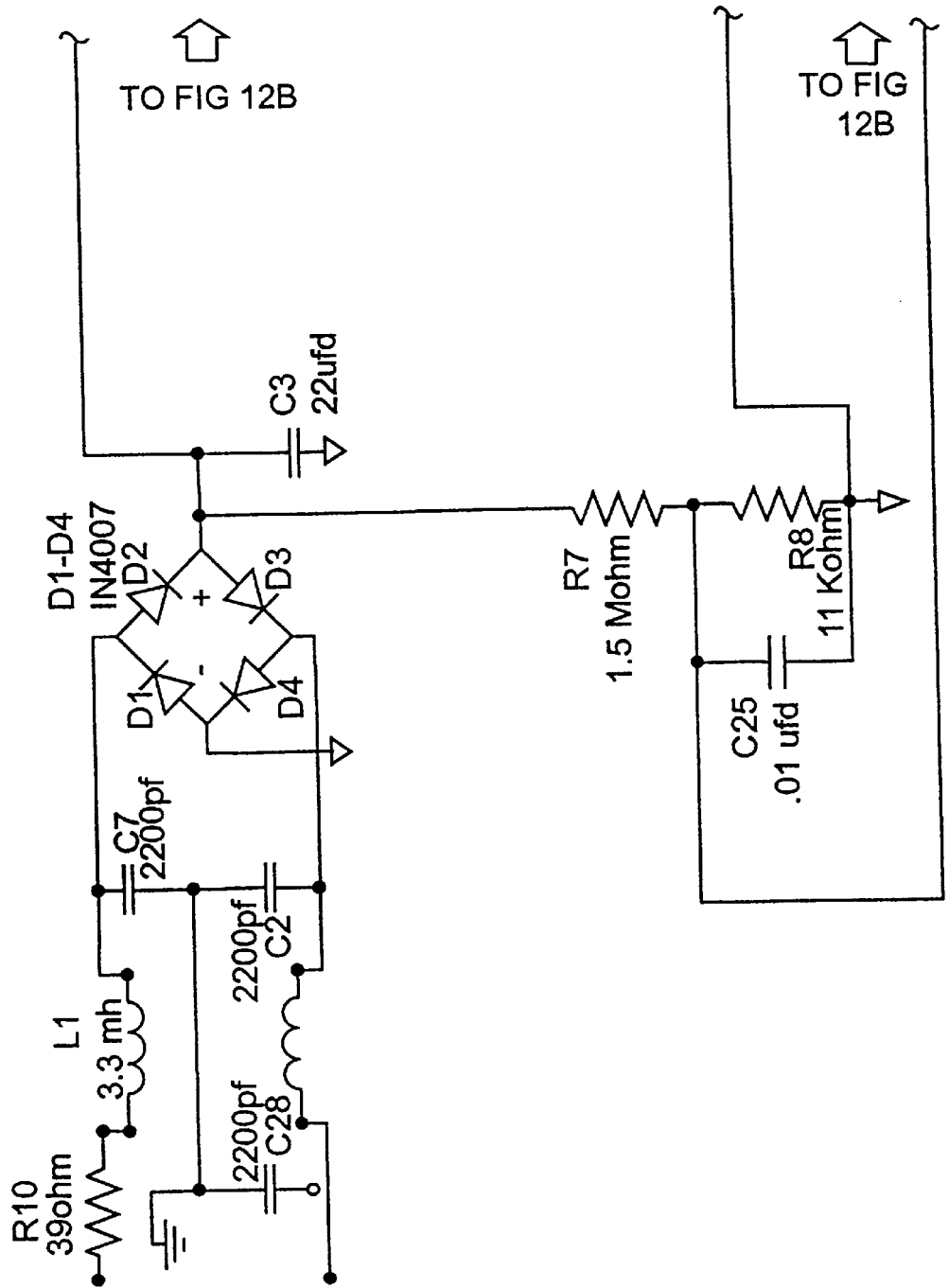
FIG. 12 is an electrical schematic diagram of one embodiment of a dimmable electronic ballast according to the present invention.
Figure 12B:
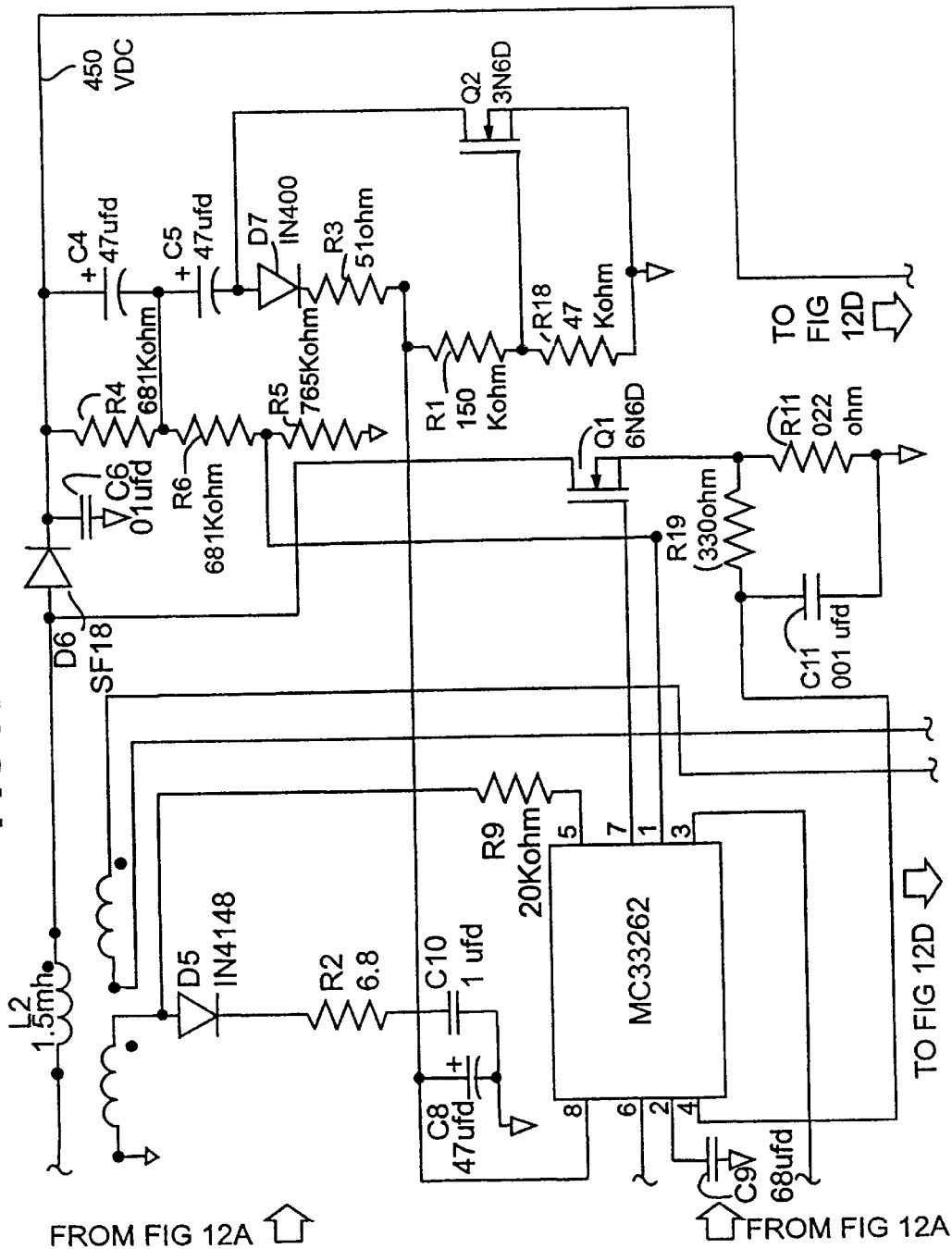
Figure 12C:
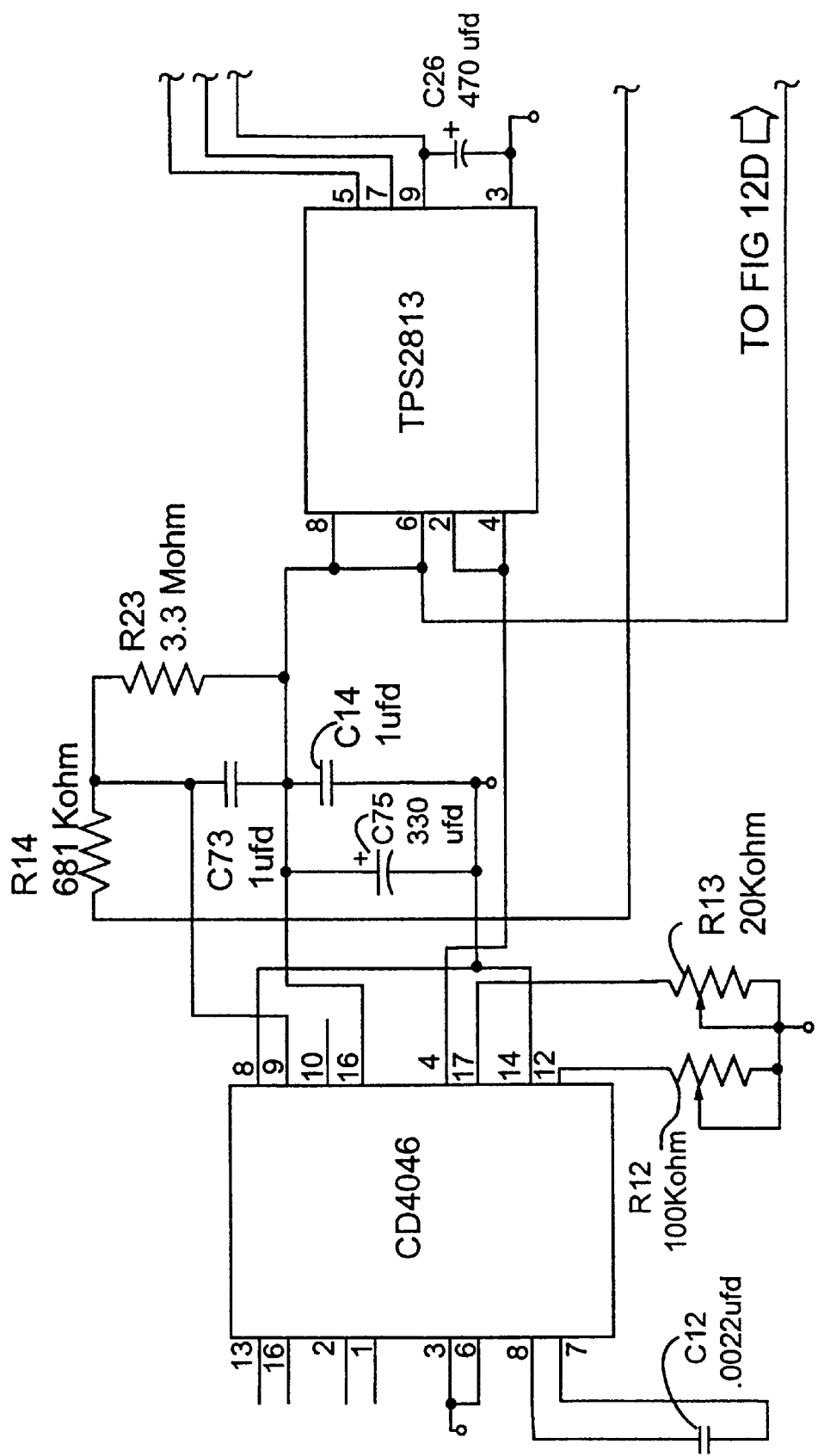
Figure 12D:
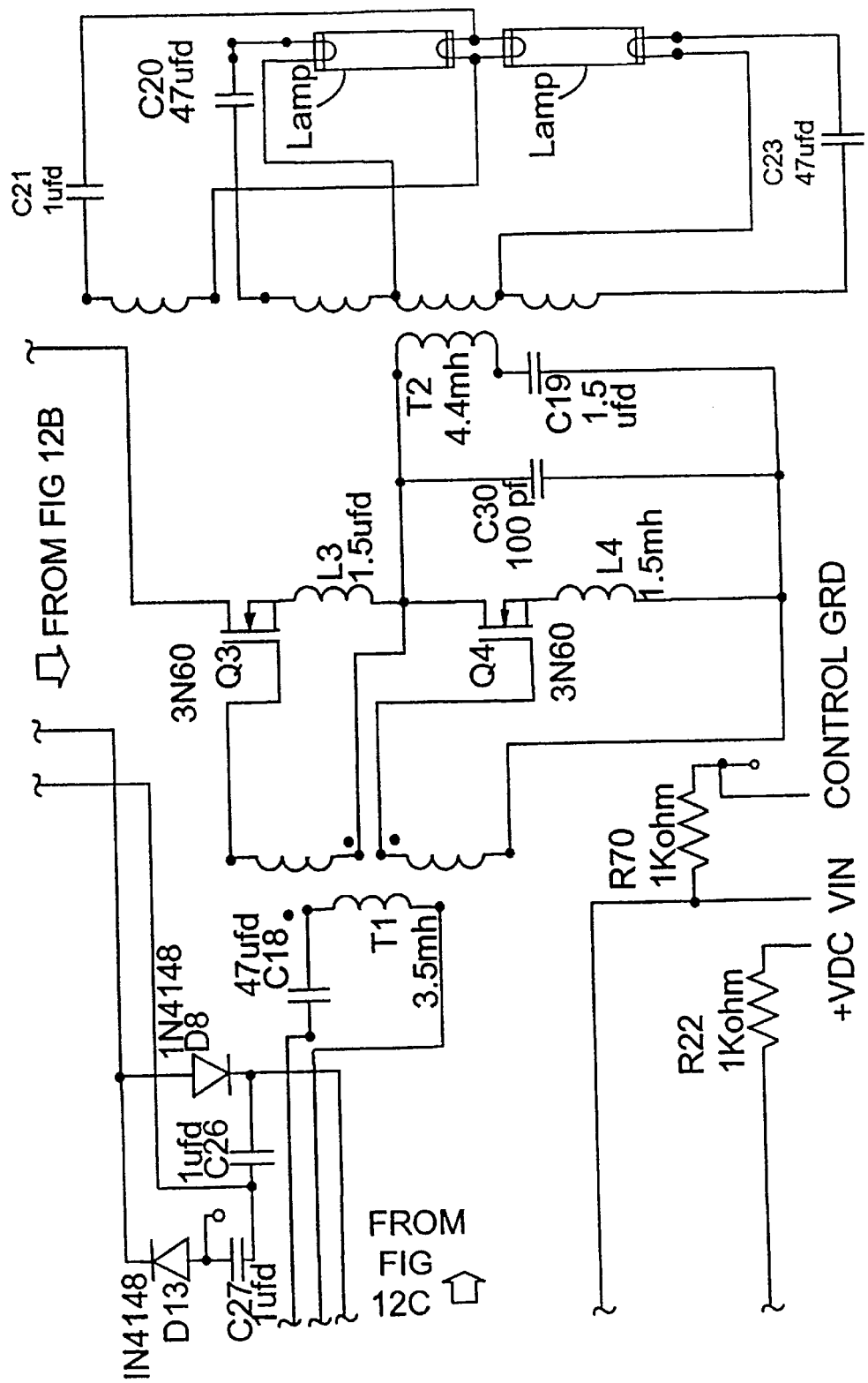

An example of how a controller 900 in accordance with the present invention can be used is illustrated schematically in FIG. 9. In the FIG. 9 arrangement, a thermoelectric cooler/heater 902 is controlled by the application of appropriate voltage from loosely coupled transformer 500 and rectifier circuit 904. As external temperature conditions change or as a user desires, feedback to or a set point signal from temperature controller 906 is used to adjust the output of frequency controller 908 to thereby change the frequency of the driver voltage impressed upon transformer 500 in a manner previously discussed in connection with the operation of electronic ballast 2.

Another example of how a controller 1000 adapted to operate in accordance with the present invention can be employed is schematically shown in FIG. 10. In the FIG. 10 arrangement, pulse driver circuitry 1002 is adapted to deliver a pulse train of varying frequency to a remote receiving circuit or load 1004 through loosely coupled transformer 500. Voltage applied to transformer 500 is set so to the lowest or fundamental frequency of pulses delivered by the pulse driver circuitry 1002 so that the maximum current drawn would be limited thereby. In the event of overload or malfunction in the secondary, feedback to shift the operating frequency point upwardly can be advantageously employed to limit current.

Yet another example of how a controller 1100 adapted to operate in accordance with the present invention can be utilized is illustrated in FIG. 11 wherein source voltage from a public power provider 1102 is passed to a substation or industrial complex load 1104 via loosely coupled transformer 500. Alternatively, the load 1104 could consist of a motor or set of motors which are periodically placed on or taken off line. Transformer 500 could be a step-up, step-down or unity wound transformer, but it can be adapted by frequency control of its characteristics so that heavy output load or a short circuit could not pull down or reduce the source voltage to other users.

It will be apparent to those of skill in the appertaining arts that various modifications can be made within the scope of the above invention. Accordingly, this invention is not to be considered limited to the specific examples chosen for purposes of disclosure, but rather to cover all changes and modifications which do not constitute departures from the permissible scope of the present invention. Having thus described my invention, what is desired to be secured and covered by Letters Patent is presented in the appended claims.

I claim:

1. A controller for regulating power delivered to a load, said controller comprising:
   a) a power supply circuit;
   b) a voltage controlled oscillator connected to the power supply circuit, wherein said voltage controlled oscillator has an input and an adjustable frequency output; and
   c) a loosely coupled transformer having at least one primary winding and at least one secondary winding, wherein the at least one primary winding is electrically connected to the adjustable frequency output, and wherein the at least one secondary winding is electrically connected to supply current to the load, wherein said current is responsive to said adjustable frequency output.

2. The controller according to claim 1 wherein said transformer has a ferromagnetic core including two openings that define a center member, wherein the primary winding and the secondary winding each are wound through the two openings and around the center member.

3. The controller according to claim 2 further comprising a bobbin captured by the center member, said bobbin having a first section for the primary winding and a second section for the secondary winding.

4. The controller according to claim 3 further comprising a separator on the bobbin, said separator located between the first section and the second section to separate the primary winding from the secondary winding.

5. The controller according to claim 1 further comprising a current measurement device connected to the load for generating a current signal.

6. The controller according to claim 5 further comprising a feedback loop incorporating the current measurement device, the input, and the load, wherein the input is connected to the current signal to thereby control current to the load.

7. The controller according to claim 1 wherein the transformer has a core with a gap therein.

8. The controller according to claim 1 wherein the transformer has a magnetic coupling ratio approximately in the range of 80% to 99%.

9. The controller according to claim 1 further comprising a potentiometer connected to the input, wherein the adjustable frequency output is responsive to the potentiometer.

10. The controller according to claim 1 wherein the load is a gas discharge lamp.

11. The controller according to claim 1 wherein the load is an electric motor.

12. The controller according to claim 1 wherein the load is an electric heater.

13. The controller according to claim 1 wherein the load is an electric cooler.

14. An electronic ballast for supplying power to a gas discharge lamp having a brightness, said electronic ballast comprising:
   a) a power supply circuit;
   b) a voltage controlled oscillator connected to the power supply circuit, wherein said voltage controlled oscillator has an input and an adjustable frequency output; and c) a loosely coupled transformer having at least one primary winding and at least one secondary winding, wherein the at least one primary winding is electrically connected to the adjustable frequency output, and wherein the at least one secondary winding is electrically connected to the lamp, wherein said brightness is responsive to said adjustable frequency output.

15. The controller according to claim 14 wherein said transformer has a ferromagnetic core including two openings that define a center member, wherein the primary winding and the secondary winding each are wound through the two openings and around the center member.

16. The controller according to claim 15 further comprising a bobbin captured by the center member, said bobbin having a first section for the primary winding and a second section for the secondary winding.

17. The controller according to claim 16 further comprising a separator on the bobbin, said separator located between the first section and the second section to separate the primary winding from the secondary winding.

18. The controller according to claim 14 wherein the transformer has a core with a gap therein.

19. The ballast according to claim 14 further comprising a current measurement device connected to the load.

20. The ballast according to claim 19 further comprising a feedback loop incorporating the current measurement device, the input, and the load, wherein the input is electrically responsive to the current measurement device to thereby control current to the load.

21. The ballast according to claim 14 wherein the transformer has a magnetic coupling ratio approximately in the range bounded by 80% and 99%.

22. The ballast according to claim 14 further comprising a potentiometer connected to the input, wherein the adjustable frequency output is responsive to the potentiometer.

23. The ballast according to claim 14 further comprising a brightness sensor connected to the input, wherein the adjustable frequency output is responsive to the brightness sensor.

24. A method for regulating electrical current utilizing a loosely coupled transformer connected to a load, said method comprising the steps of:
   a) supplying power to a voltage controlled oscillator to thereby create an output having a frequency;
   b) supplying the output to the loosely coupled transformer to thereby supply current to a load; and
   c) adjusting the frequency of the output to thereby adjust the current delivered to the load according to reactance in the loosely coupled transformer.

25. The method of claim 24 further comprising the step of generating a signal representative of the current delivered to the load.

26. The method of claim 25 further comprising the step adjusting the frequency in response to the signal.

27. An electronic ballast for supplying power to a gas discharge lamp having a brightness, said electronic ballast comprising:
   a) a power supply circuit;
   b) a voltage controlled oscillator connected to the power supply circuit, wherein said voltage controlled oscillator has an input and an adjustable frequency output;
   c) a loosely coupled transformer having at least one primary winding and at least one secondary winding, wherein the at least one primary winding is electrically connected to the adjustable frequency output, and wherein the at least one secondary winding is electrically connected to the lamp, and wherein said transformer has a ferromagnetic core including two openings that define a center member, with the primary winding and the secondary winding each wound through the two openings and around the center member; and
   d) a potentiometer connected to the input, wherein the brightness is responsive to the potentiometer.

* * * * *